US 7,617,539 B2

(12) United States Patent
Hatano

(10) Patent No.: US 7,617,539 B2
(45) Date of Patent: Nov. 10, 2009

(54) IMAGE PROCESSING DEVICE, DOCUMENT DATA TRANSMISSION METHOD, PROGRAM, AND STORAGE MEDIUM FOR IMAGE PROCESSING DEVICE

(75) Inventor: Manami Hatano, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 771 days.

(21) Appl. No.: 11/220,956

(22) Filed: Sep. 7, 2005

(65) Prior Publication Data

US 2006/0064597 A1    Mar. 23, 2006

(30) Foreign Application Priority Data

Sep. 17, 2004    (JP)    .............. 2004-271720

(51) Int. Cl.
G06F 7/04 (2006.01)
G06F 17/30 (2006.01)
G06F 3/12 (2006.01)
G06K 15/00 (2006.01)

(52) U.S. Cl. .............. 726/26; 358/403; 358/1.14; 358/1.15; 358/1.16; 380/55; 380/243

(58) Field of Classification Search ............ 726/26; 358/403, 1.14, 1.15, 1.16; 380/55, 243
See application file for complete search history.

(56) References Cited

U.S. PATENT DOCUMENTS

| | | | | |
|---|---|---|---|---|
| 7,033,091 | B2 * | 4/2006 | Nakao | ............ 400/76 |
| 7,376,706 | B2 * | 5/2008 | Goguen | ............ 709/206 |
| 7,412,602 | B2 * | 8/2008 | Park et al. | ............ 713/182 |
| 2003/0151766 | A1 * | 8/2003 | Clough et al. | ............ 358/1.15 |
| 2004/0021889 | A1 * | 2/2004 | McAfee et al. | ............ 358/1.13 |
| 2004/0024811 | A1 | 2/2004 | Kitada et al. | |
| 2004/0117655 | A1 * | 6/2004 | Someshwar | ............ 713/201 |
| 2004/0125393 | A1 * | 7/2004 | Maehara | ............ 358/1.13 |
| 2004/0158733 | A1 * | 8/2004 | Bouchard | ............ 713/200 |
| 2005/0018237 | A1 * | 1/2005 | Cossel et al. | ............ 358/1.15 |
| 2006/0139680 | A1 * | 6/2006 | Okamoto et al. | ............ 358/1.14 |

FOREIGN PATENT DOCUMENTS

| | | |
|---|---|---|
| EP | 0629076 A2 | 12/1994 |
| EP | 1102473 A2 | 5/2001 |
| JP | 07-183984 A | 7/1995 |
| JP | 2001-211306 A | 8/2001 |

(Continued)

OTHER PUBLICATIONS

S. Hinde. "Spam: the evolution of a nuisance", Computers and Security 22 (6) (2003) 474-478.*

*Primary Examiner*—Michael J Simitoski
(74) *Attorney, Agent, or Firm*—Canon U.S.A. Inc., I.P. Division

(57) ABSTRACT

An image processing device comprises a storage unit which has multiple storage regions and stores document data within the storage regions, a security settings unit which performs settings relating to security as to the storage regions, and a specifying unit for specifying document data to be sent externally from the document data stored in storage unit, and determines whether the storage region in which the specified document data specified by the specifying unit is stored is a storage region in which settings relating to security by the security settings unit is set, and decides based on results of such determining whether to permit or prohibit sending of document data.

11 Claims, 16 Drawing Sheets

FOREIGN PATENT DOCUMENTS

| | | |
|---|---|---|
| JP | 2002-077506 A | 3/2002 |
| JP | 2002-111936 A | 4/2002 |
| JP | 2002-229916 A | 8/2002 |
| JP | 2004-227056 A | 8/2004 |
| WO | WO 0197504 A1 * | 12/2001 |

* cited by examiner

FIG. 14

E-MAIL: from imageRunner X300

From: imageRunner X300 <iRX300@printers.eanon.co.jp>
To: <administrator@printers.eanon.co.jp>
Subject: WARNING transmission need to be authorized.
Date: November 22, 2003 15:00:32 +0900

AN ATTEMPT WAS MADE ON NOVEMBER 22 AT 14:59
TO SEND THE DOCUMENT DATA
"CUSTOMER N BUSINESS PROPOSAL SEPTEMBER 25"
STORED IN THE BOX "INTERNAL USE ONLY BOX"
TO THE FOLLOWING ADDRESSES.

To: evilcompany@evilcompanies.xxx
someonespecial@eanon.co.jp
oipmembers@eanon.co.jp
Subject: PROPOSAL FROM THE OTHER DAY.

THE ADDRESSES INCLUDE ADDRESSES NOT PERMITTED
FOR SENDING WITHOUT AUTHORIZATION.
PLEASE OBTAIN AUTHORIZATION BY ACCESSING THE FOLLOWING URL.

http://xxx.xxx.xxx.xxx/box_send_authorization/nnnnn

--
imageRunner X300

🗐 CUSTOMER N BUSINESS PROPOSAL SEPTEMBER 25

IMAGE PROCESSING DEVICE, DOCUMENT DATA TRANSMISSION METHOD, PROGRAM, AND STORAGE MEDIUM FOR IMAGE PROCESSING DEVICE

BACKGROUND OF THE INVENTION

1. Field of the Invention

The present invention generally relates to an image processing device and a document data transmission method for an image processing device, and more particularly relates to a method for suitably transmitting accumulated document data with a multi-function peripheral (MFP) for example, via a network, to another information processing device, and a technique using an MFP which has a function for transmitting the document data via a network to another information processing device.

2. Description of the Related Art

Conventionally, an MFP such as a digital photocopier, a digital multi-function device, and the like, has a function to internally accumulate document data read from a document reading device (hereafter called a scanner) equipped therewith, and to transmit the accumulated document data via a network to another information processing device.

Further, the storage device in which the document data is accumulated internally is divided into multiple regions called boxes to organize and accumulate the document data, and names and so forth are given to each box. Also, the document data is typically classified into boxes so that the document data can be easily reached.

With an information processing system which can accumulate such document data, in order to protect sensitive information included in the documents, a password can be set on the document data itself so as not to allow anyone other than the user who knows the password to read the contents of the document data, or a password can be set on the box region in which the document data is located so as not to allow access to the document data located in this box except by a person who knows the password. Building in such security functions have been performed conventionally.

On the other hand, technology that adds restrictions to the communication via a network already exists, such as that illustrated in Japanese Patent Laid-Open No. 2002-229916, which processes the document data, which is sent from an external sender, after adding restrictions on the receiving side based on the information such as the electronic mail address from the sender, in the case of printing the document data received via the network, with a multi-function printing device including a device such as a facsimile device which is connected to a network.

Similarly, with a multi-function printing device including a device such as a facsimile device which is connected to a network, as illustrated in Japanese Patent Laid-Open No. 2002-077506 or Japanese Patent Laid-Open No. 2002-111936, generally restrictions exist on the reception capacity of electronic mail and so forth according to the addressee in the case of directly sending the document data read from the document reading device via a network. Thus, devices exist which add restrictions to the sending operation for the purpose of preventing sending failures and so forth based on such reception capacity restrictions.

As a separate technology, a device exists that has a security function which restricts the transfer operations based on attribute values such as the degree of secrecy given to the received document data itself, in the instance of transferring the document data received via a network to a separate multi-function printing device, such as that shown in Japanese Patent Laid-Open No. 2001-211306.

However, with the method of setting a password for the above-described document data or the box in which the document data is located, if an internal person knows the password, the document data accumulated in the box can be accessed, and the document thereof can freely be sent externally using the sending function, and document data with high secrecy can be stolen. Also, the above-mentioned Japanese Patent Laid-Open No. 2002-229916 is a technology for performing restrictions on the receiving side and therefore is not effective at all with regard to such a case.

Also, with the technology described in Japanese Patent Laid-Open No. 2002-077506 and Japanese Patent Laid-Open No. 2002-111936, if security is not considered, it is difficult for someone other than the person who is trying to send the address to know the address to which the document data is to be sent, and therefore the problem has had no effective solution.

Also, even with the technology described in Japanese Patent Laid-Open No. 2001-211306, in a situation such as that described above, the sending of the document data which is problematic is not performed by transferring the document data which is sent from elsewhere, but rather performed on the data that has once been saved into the box, and therefore the problem could not have an effective solution.

SUMMARY OF THE INVENTION

The present invention provides improved security for document data with a high degree of secrecy within the document data accumulated in the box for the purpose of organizing document data, in view of the above-described programs.

According to an aspect of the present invention, an image processing device includes a storage unit having multiple storage regions and is adapted to store document data within the storage regions; a security settings unit adapted to perform settings relating to security as to the storage regions; a specifying unit adapted to specify the document data to be sent externally from the document data stored in the storage unit; and a control unit adapted to determine whether the storage region in which the document data specified by the specifying unit is stored is a storage region in which the settings relating to security has been set by the security settings unit, and to decide based on results of such determining whether to permit or prohibit sending of the document data.

According to another aspect of the present invention, a document data sending method carried out with an image processing device having a storage unit which has multiple storage regions and stores document data within the storage regions includes: a security setting step which performs settings relating to security as to the storage regions; a specifying step for specifying the document data to be sent externally from the document data stored in the storage unit; and a control step for determining whether the storage region in which the document data specified by the specifying step is stored is a storage region in which settings relating to security by the security settings step is set, and for deciding based on results of such determining whether to permit or prohibit sending of the specified document data.

Further features of the present invention will become apparent from the following description of exemplary embodiments with reference to the attached drawings.

BRIEF DESCRIPTION OF THE DRAWINGS

FIG. 14 is a diagram illustrating an example of a warning electronic mail sent to the administrator in accordance with the fourth embodiment of the present invention.

DESCRIPTION OF THE EMBODIMENTS

Exemplary embodiments of the present invention will now be described in detail in accordance with the accompanying drawings.

First Embodiment

First, a first embodiment of the present invention will be described with reference to the accompanying drawings.

Figure 1:
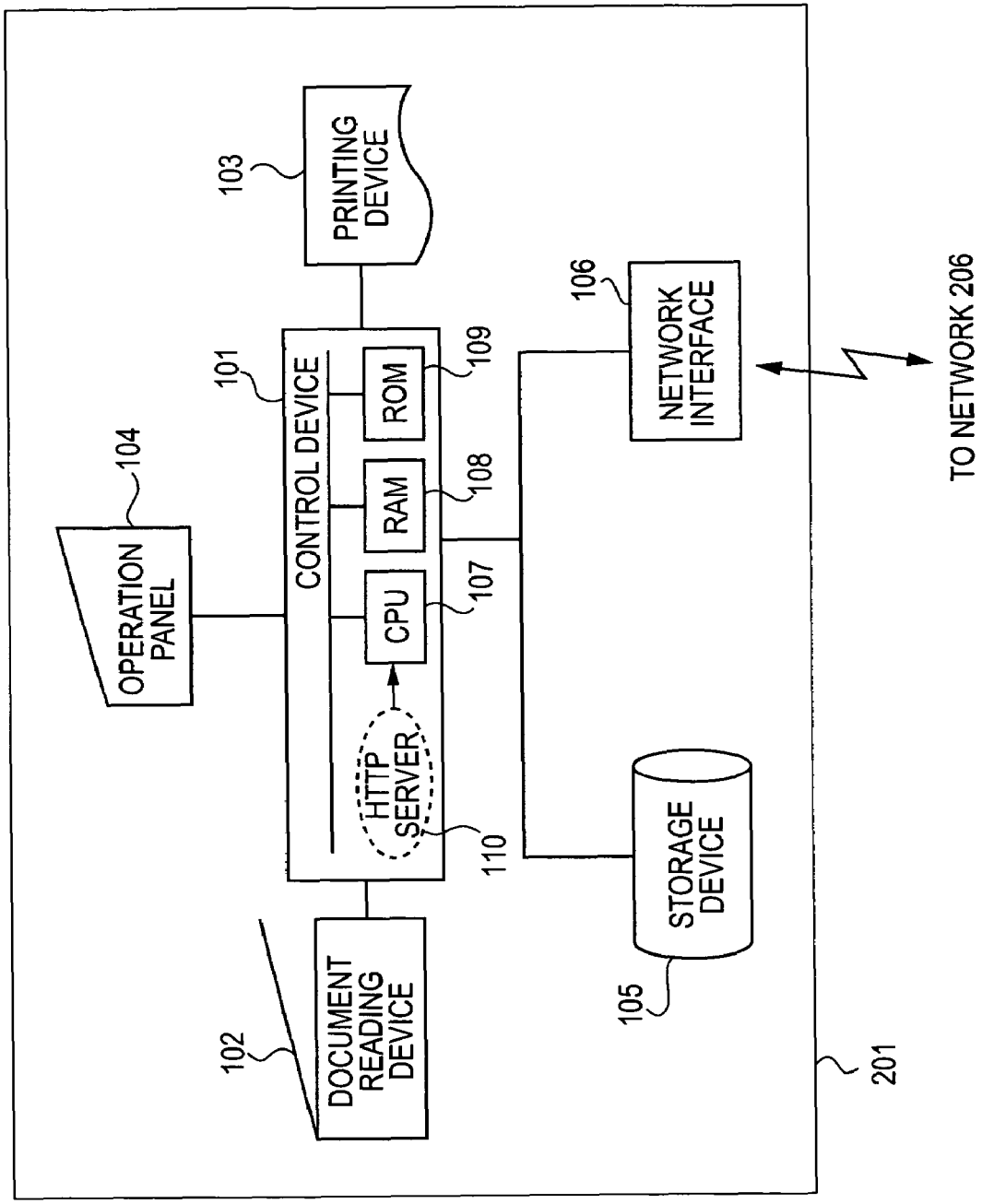
FIG. 1 is a block diagram illustrating the configuration of an MFP according to an embodiment of the present invention.

FIG. 1 is a block diagram illustrating an exemplary configuration of the principal portions of a digital multi-function device (MFP) 201 as an image processing device according to the first embodiment of the present invention. In FIG. 1, a control device 101 handles the control of the entire MFP 201. A central processing unit (CPU) 107, random access memory (RAM) 108 and read only memory (ROM) 109 are also included in the control device 101. Further, the CPU 107 is capable of executing a HyperText Transfer Protocol (HTTP) server program 110 (described later), and thus the MFP 201 can provide a World Wide Web (WWW) server function. A document reading device (scanner) 102 reads a manuscript image and generates image data. A printing device 103 prints and outputs image data read with the document reading device 102, and data received from other MFPs 201, workstations or client computers via network interface. Also, the printing device 103 outputs by printing the image data which is accumulated in a storage device 105. An operation panel 104 receives operating instructions to the MFP by the user. The storage device 105 accumulates the image data generated by the document reading device 102 or the image data received via a network interface (hereafter, these types of image data will be called document data). Now, the storage device 105 is formed of multiple storage regions called boxes. With the present embodiment, the storage device 105 is a large-capacity hard disk (HD), but other storage media such as flash memory or the like or combinations of storage media can be used. This will be described in further detail later. A network interface 106 is an interface between the MFP 201 and a network 206.

Figure 2:
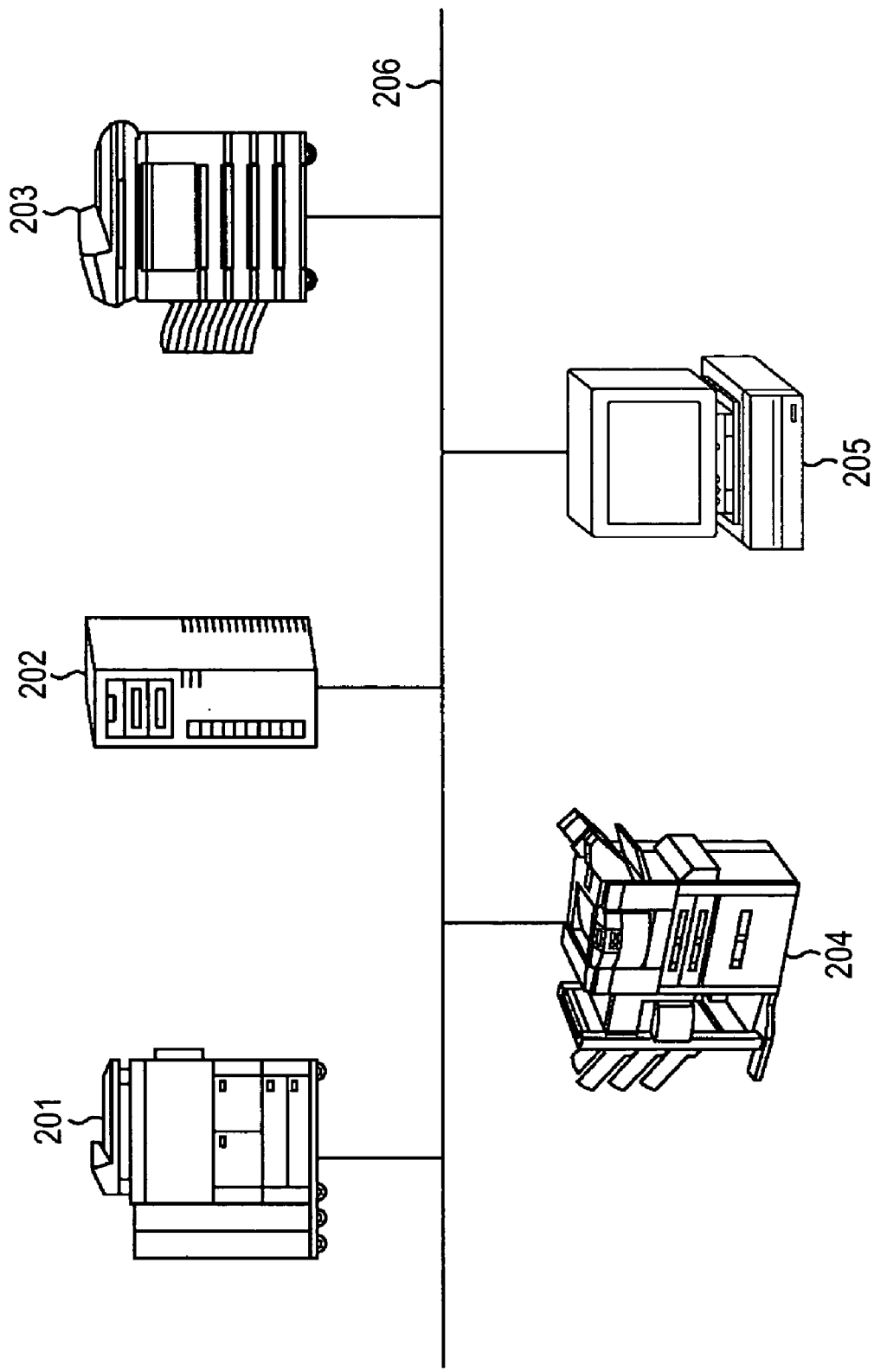
FIG. 2 is a diagram showing a network to which the MFP shown in FIG. 1 is connected.

FIG. 2 is a diagram showing a network 206 connected to the MFP 201. In FIG. 2, information devices including the MFP 201, a server 202, MFPs 203 and 204, and a workstation 205 are connected to a network 206 which connects these information devices. Similar to the MFP 201, the MFPs 203 and 204 each have a configuration such as that shown in FIG. 1.

Figure 3:
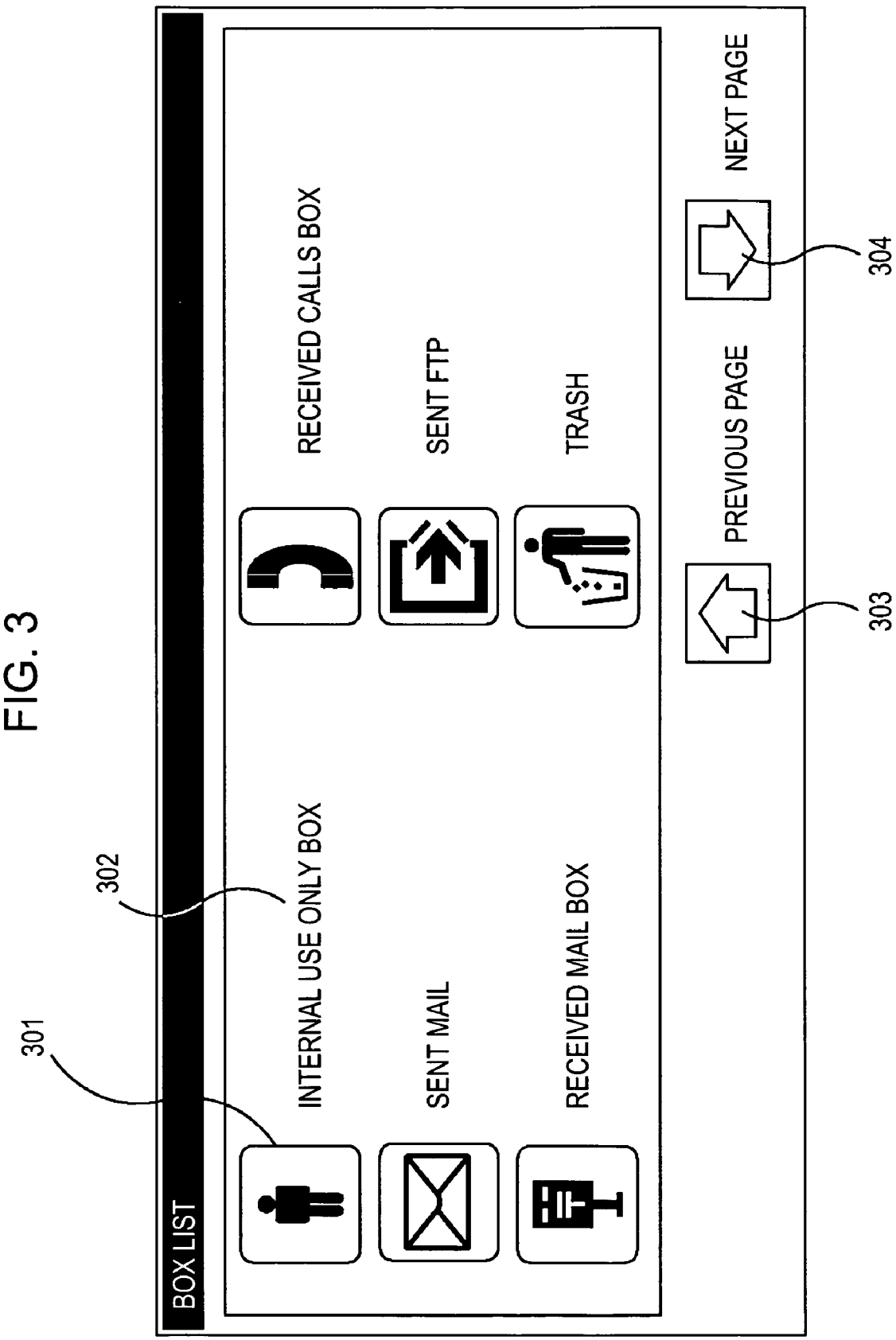
FIG. 3 is a diagram illustrating an example of a box list screen according to a first embodiment of the present invention.

FIG. 3 is a diagram illustrating an example of a box list display screen with a box functionality of the MFP 201. This screen is displayed on the operation panel 104 when a box is selected. Here, an embodiment of the box is assumed to be a file-dividing function of the file system constructed on the storage device 105.

In FIG. 3, an icon 301 is a symbol mark given to a box. In actually performing, such a graphical symbol mark can be given to the box, or another expression method can be used.

A box name 302 is used to easily differentiate and name the box. It is desirable for the administrator or the user to be able to name a general box, but a box for a specialized function can be given a specific name, and some restrictions can be provided relating to the names that can be given. FIG. 3 illustrates an example having six boxes displayed on one screen.

If there are any boxes that are earlier in the order than the boxes displayed here, a previous page button 303 can be pressed to cause the display screen to switch so as to display up to six of these earlier boxes. If there are any boxes which are later in the order than the boxes displayed here, a next page button 304 can be pressed to cause the display screen to switch so as to display up to six of these later boxes. If there are no earlier boxes, the previous page button 303 is disabled (grayed out) and is ineffective if pressed. If there are no later boxes, the next page button 304 is disabled (grayed out) and is ineffective if pressed.

Figure 4:
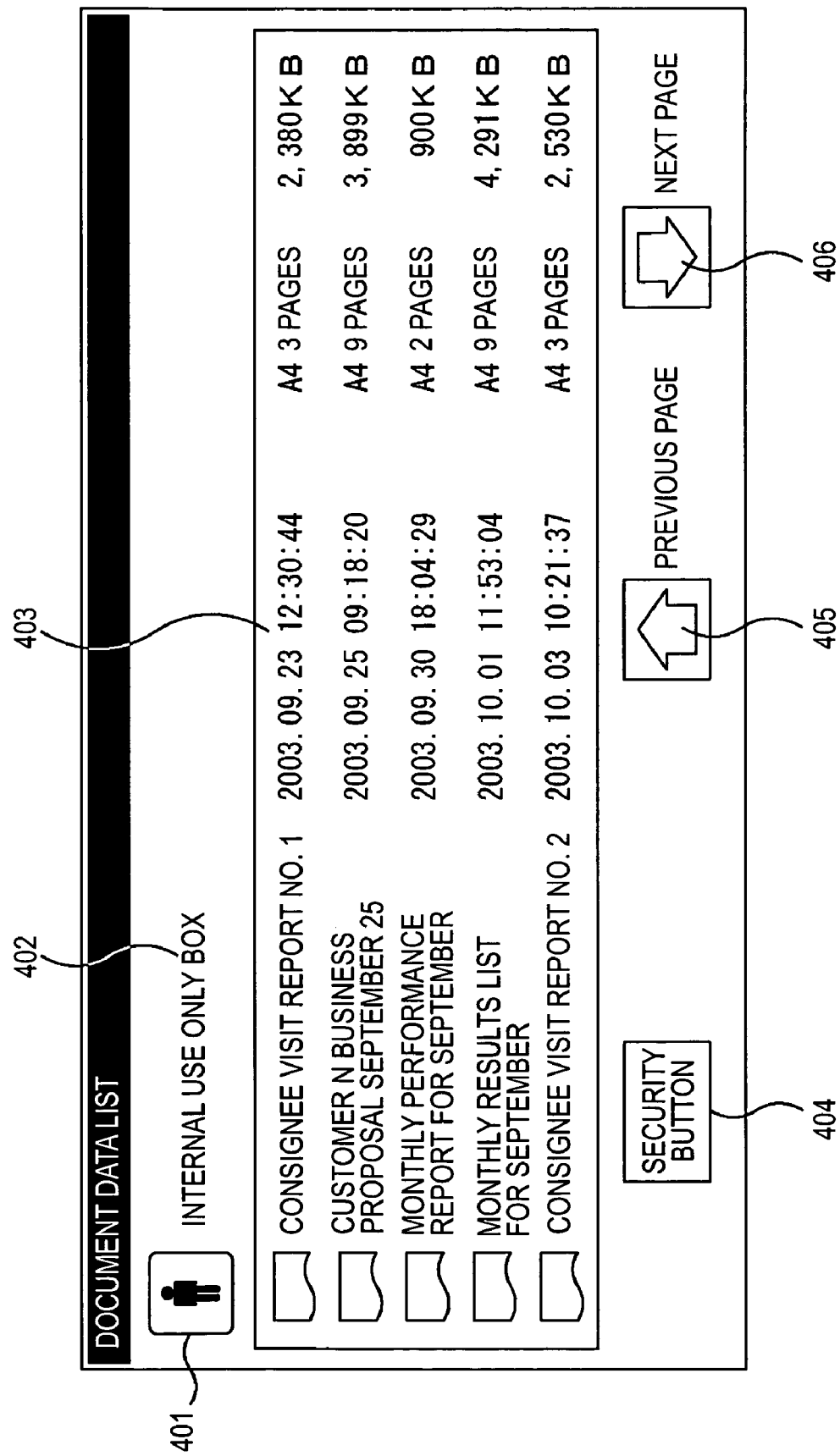
FIG. 4 is a diagram illustrating an example of the list screen of the document data within the box in accordance with the first embodiment of the present invention.

FIG. 4 illustrates an example of a screen that displays the contents of a box displayed on the operation panel 104 in the box functionality of the present embodiment. This screen is displayed on the operation panel 104 after selecting a box. Here, the box is assumed to store only document data, and the document data is assumed to be stored as a file of a file system constructed on the storage device 105.

In FIG. 4, an icon 401 is a symbol mark given to the box currently displayed, and is similar to the display of the symbol mark 301 in FIG. 3. A box name 402 is the name given to the box currently displayed, and is similar to the display of the box name 302 in FIG. 3.

A list 403 is a document data list displaying the information of the document data in the form of a list, and here the information of five document data selections is displayed. In the example shown in the list 403 of FIG. 4, each piece of document data information displays from the left, an icon, a document data name, a creation date and time, a paper size and number of pages, and a file size.

Pressing a security setting button 404 causes a display to be shown which allows an operating user to display and set the security settings relating to the displayed box (e.g., in the example shown in FIG. 4, an Internal Use Only box). This security setting button 404 can be set so as to not be displayed if the operating user does not have administrator authorization.

In the case that a previous page button 405 is pressed, if there is any document data which is earlier in the order than the document data currently displayed within the box, the display content of the document data list 403 switches so as to display up to five of these earlier data items. In exemplary embodiments, if there are not any earlier data items the previous page button 405 is disabled (grayed out and ineffective if pressed).

In the case that a next page button 406 is pressed, if there is any document data which is later in the order than the document data currently displayed within the box, the display content of the document data list 403 switches so as to display up to five of these later data items. In the case that there is no later document data, the next page button 406 can be rendered disabled (grayed out and rendered ineffective).

Figure 5:
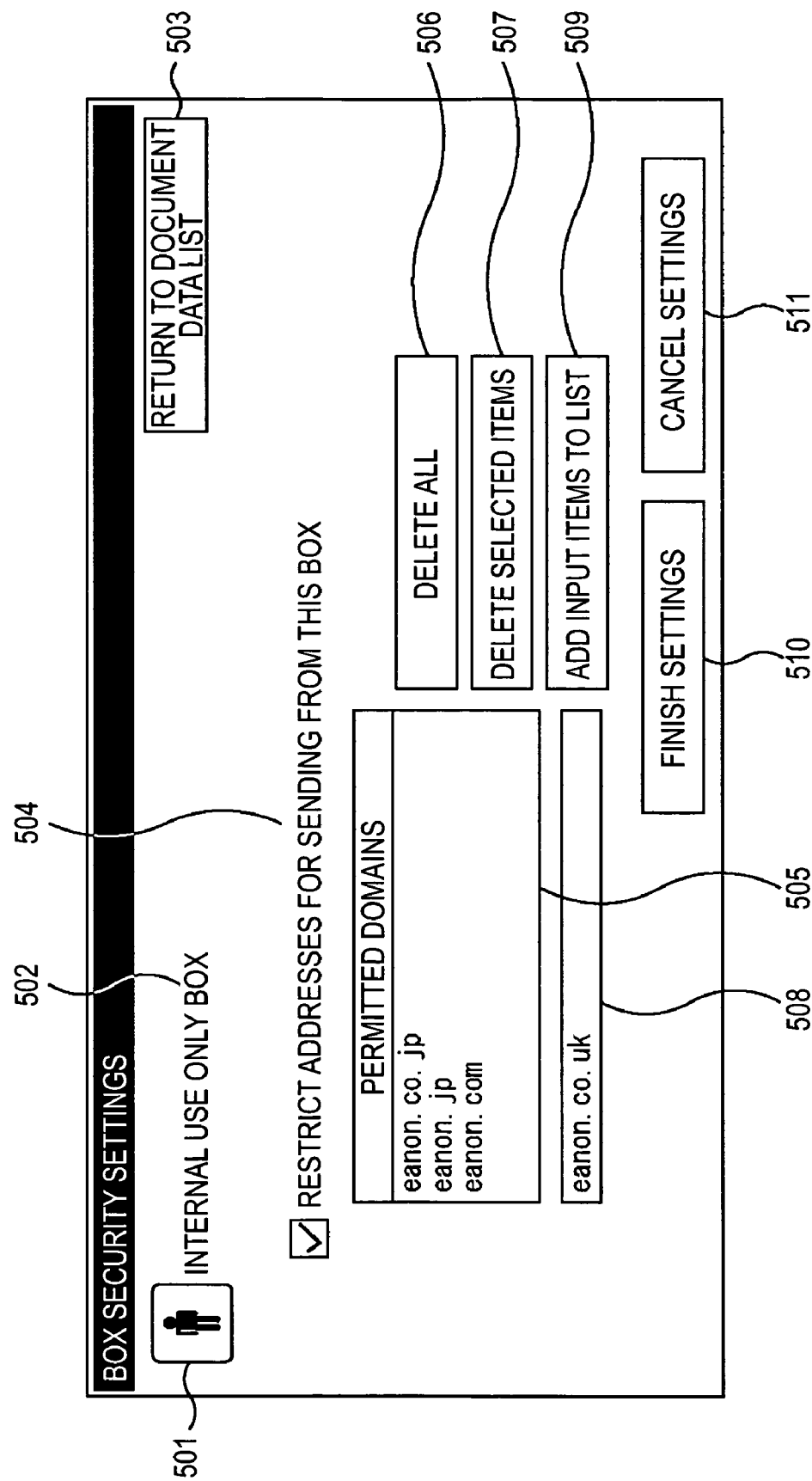
FIG. 5 is a diagram illustrating an example of a security settings screen for the box in accordance with the first embodiment of the present invention.

FIG. 5 is a security setting screen for the box displayed on the operation panel 104 in the box functionality of the present embodiment. This is a screen which is displayed by pressing the security setting button 404 from the screen illustrated in FIG. 4.

An icon 501 is a symbol mark given to the box currently displayed, and is similar to the display of the symbol mark 301 in FIG. 3. A box name 502 is the name given to the box currently displayed, and the same name is displayed as is displayed in the box name 302 in FIG. 3.

A return button 503 is a button for returning to the document data list in FIG. 4, and when this return button 503 is pressed, the display switches to the screen illustrated in FIG. 4. A restrict addresses check box 504 is for deciding whether or not to restrict the addresses in the case of sending from this box. In the case that the restrict addresses check box 504 is checked as illustrated in FIG. 5, the appropriate security settings are made as to this box, and in the case of sending document data from this box, address restrictions are performed.

A permitted domains list 505 is a list of the domains of the addresses to which sending is permitted. In the case there is a check in the restrict addresses check box 504, the documents accumulated in this box are permitted to be sent to the domains displayed in the permitted domains list 505. Now, with the present embodiment, "domain" expresses a group that includes a network in the Internet or an intranet network. Pressing a delete all button 506 causes the entries of the domains kept in the permitted domains list 505 to all be deleted after verification on the screen. Here, a verification message such as "All will be deleted; okay to proceed?" can be displayed, in which case the domains can all be deleted only when the user verifies that all are to be deleted.

Pressing a delete selected items button 507 causes any entries selected to be deleted in the case that there are entries of domains which have previously been selected in the permitted domains list 505 which permits sending. In the case that nothing is selected in the permitted domains list 505 which permits sending, the delete selected items button 507 can be disabled (grayed out and rendered ineffective) so as to not accept a button being pressed.

An input box 508 is a character input box for inputting a domain name. Pressing an add input items to list button 509 after inputting the text string of a domain name into the character input box 508 causes the text string of the domain name input into the character input box 508 to be added to the permitted domains list 505.

The add input items to list button 509 can be set so as to be rendered ineffective when the input box of the character input box 508 is empty. Also, when the check is missing from the restrict addresses check box 504, the various controls for the adding button 509 to the permitted domains list 505 which permits sending can be rendered ineffective.

A setting completion button 510 is a button for instructing to complete the settings. When this setting completion button 510 is pressed, a change made to the restrict addresses check box 504 or changes made to the permitted domains list 505 are all validated and the settings of the box are completed in this state. A setting cancel setting button 511 is a button for instructing to cancel the settings. When the setting cancel button 511 is pressed, all of the changes made to the restrict addresses check box 504 or the permitted domains list 505 which permits sending are discarded, and the box is in the state of having the settings as they were before entering the setting screen in FIG. 5. After the setting completion button 510 or the setting cancel button 511 are pressed and the settings are either reflected or discarded, the operation panel returns to the document data list screen in FIG. 4. An implementation which shifts the screen to another screen is also possible.

Figure 6:
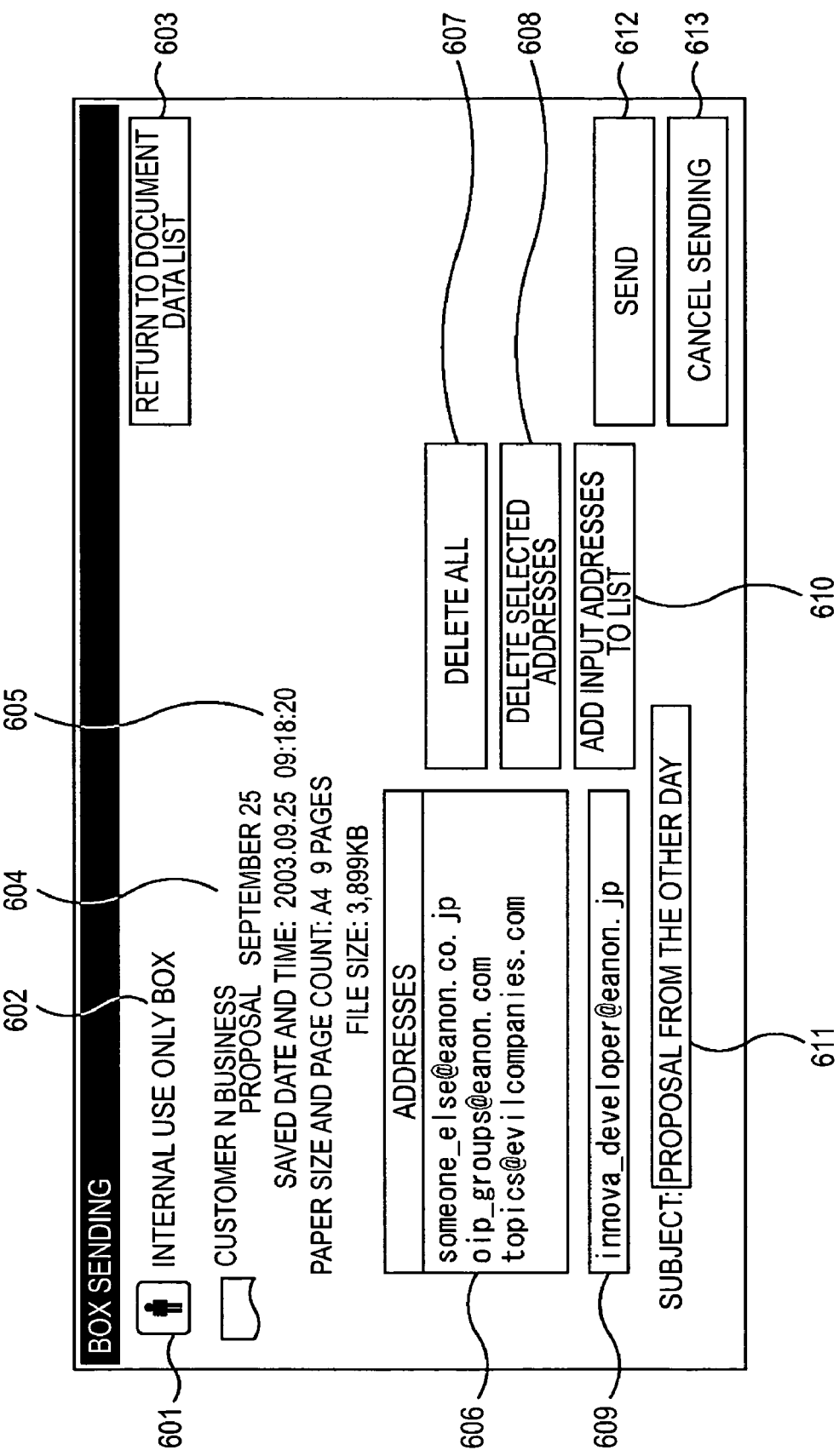
FIG. 6 is a diagram illustrating an example of a screen for sending the document data from the box in accordance with the first embodiment of the present invention.

FIG. 6 is a diagram illustrating one example of a screen for sending the document data within the box, displayed on the operation panel 104 of the present embodiment. This is a screen which is called up by selecting one of the document data from the document data list in FIG. 4. Alternatively, a send the selected items button can be added to the screen in FIG. 4 wherein this screen would be called up in the case that this button is pressed.

In FIG. 6, an icon 601 is a symbol mark given to the box currently displaying wherein the document data is stored, and is similar to the display of the symbol mark 301 in FIG. 3. A box name 602 is the name given to the box currently displayed in which the document data is stored, and is similar to the display of the box name 302 in FIG. 3.

A return button 603 is a "return to document data list" button, and by pressing the return button 603, the display of the operation panel 104 is transitioned to the document data list screen illustrated in FIG. 4. An icon and document data name 604 identifies the currently displayed document data. In the example shown in FIG. 6, other information 605 of the currently displayed document data displays the saved date and time, the paper size and page count, and the file size for the information relating to the currently displayed document data. An address list 606 displays e-mail addresses for sending the document.

Pressing a delete all button 607 causes all of the e-mail addresses displayed in the address list 606 to be deleted, and the list becomes empty. Pressing a delete selected addresses button 608 causes the e-mail addresses currently selected within the address list 606 to be deleted. In the case that no items in the address list 606 are selected, the delete selected addresses button 608 can be rendered ineffective.

The input box 609 is a text string input box for inputting an e-mail address. When a text string is input into the text string input box 609 and an add input addresses to list button 610 is pressed, the text string which is input into the text string input box 609 is added to the address list 606. In the case that the input box of the text string input box 609 is empty, the add input addresses to list button 610 can be rendered ineffective.

The input box 611 is a text string input box for inputting a subject. Pressing a send button 612 causes an e-mail to be sent with the subject in the input box 611 to the e-mail addresses specified in the address list 606, and attaches the document data currently displayed.

Pressing a cancel sending button 613 causes the transmission to be cancelled. The screen can be set to return to the document data list in FIG. 4 after sending is cancelled, or the address list 606, the input box for inputting an e-mail address in the text string input box 609, and the input box 611 for inputting a subject, can each be displayed in a cleared state. Also, in the case that the address list 606 is empty, the send button 612 can be rendered ineffective.

Further, in the case that the input box 611 for inputting a subject line is empty, the send button 612 can be rendered ineffective. Alternatively, in the case that the input box 611 for inputting a subject line is empty, the operation panel 104 can display a query message such as "the subject line is empty—continue sending?", in which case sending is only performed when the user verifies the sending, and in the case that the user cancels the sending, the screen can return to the address list in the screen in FIG. 6 which retains the values input thus far.

Figure 7:
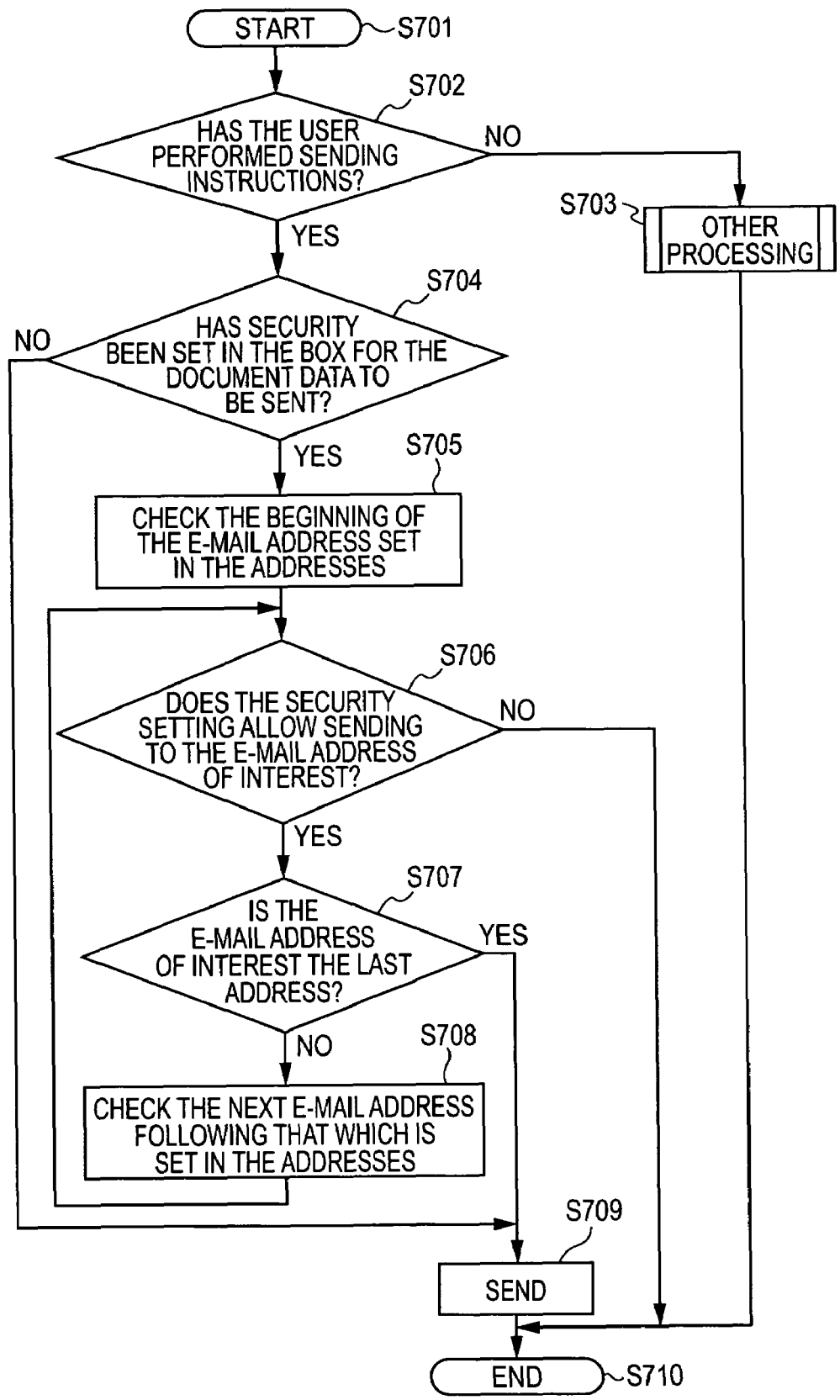
FIG. 7 is a flow chart illustrating the sending operation of the MFP in accordance with the first embodiment of the present invention.

FIG. 7 is a flow chart illustrating the processing flow in the case of sending document data from a box in accordance with the present embodiment. The present flow chart is executed with the CPU 107 of the MFP 201. In Step S701 the process starts. In the following Step S702 determination is made as to whether or not the user has performed sending instructions. If the instructions performed by the user are not sending instructions, the process proceeds to Step S703. In Step S703, processing is performed for any other content instructed by the user, and afterwards the process proceeds to Step S710 and processing ends.

As a result of the determination of Step S702, in the case that the instructions performed by the user are sending instructions, the process proceeds to Step S704. The sending instructions by the user also include instructions for selecting the document data to be sent from a box, or instructions for sending addresses. In Step S704 determination is made as to whether or not the box in which the document data with sending instructions is stored has been subjected to security settings. As a result of this determination, in the case that security is not set, the process proceeds to Step S709. In the case that it is determined in Step S704 that security settings have been set, the process proceeds to Step S705.

In Step S705, the first entry in the list of e-mail addresses set for an address by the sending instructions is checked. Then the process proceeds to the following Step S706. In Step S706 determination is made as to whether or not the current e-mail address of interest is an address within the domains permitted for sending in the security settings in the box. As a result of this determination, in the case this is not a permitted address, the process proceeds to Step S710 and processing ends. If it is determined in Step S706 that the current e-mail address of interest is a permitted address, the process proceeds to step S707.

In Step S707 determination is made as to whether or not the current address of interest is the last entry in the e-mail addresses list set in the addresses, and in the case it is the last entry, the process proceeds to Step S709. If it is determined in Step S707 that the current address of interest is not the last entry in the e-mail addresses list, the process proceeds to step S708. In Step S708, the next entry in the e-mail address list set in the addresses is checked, and the process returns to Step S706 and the process is repeated for the next address.

On the other hand, as a result of the determination in Step S707, in the case that the address of interest is the last address, or if the current box in Step S704 does not have security settings, the process proceeds to Step S709. In the case that the process came to Step S709 from Step S704, this indicates that any transmission is permitted without any conditions because this box has no security settings. In the case that the process came to Step S709 from Step 707, this indicates that the email addresses included in all e-mail address lists are checked and the results confirm that the settings permit sending to all of these addresses.

In Step S709 sending operations are performed based on the sending instructions by the user. The processing then proceeds to Step S710 and the process is ended.

Also, as a result of the determination in Step S706, in the case that any one of the e-mail addresses has not been permitted for sending, the process ends without flowing through Step S709, and without a sending operation. In the case that sending is permitted, the sending is correctly executed and the process is ended, so that the process proceeds to Step S710 after the sending is performed in Step S709. Thus, if the security settings are correctly set in the box, the sending to addresses not permitted for sending will be prevented.

Thus according to the first embodiment, by preparing a box for storing secret documents and by performing security settings therein in advance, the user can prevent sending of secret document data stored in this box to addresses other than those permitted.

Second Embodiment

Next, a second embodiment of the present invention will be described while referencing the drawings. The configuration of an MFP 201 according to the present embodiment is the same as that illustrated in FIG. 1, and therefore the illustration is omitted. The diagram showing the network connected to the MFP 201 according to the present embodiment is the same as that illustrated in FIG. 2. Also, an example of a box list screen according to the present embodiment is the same as that illustrated in FIG. 3 and an example of the document data list screen in a box is the same as that illustrated in FIG. 4.

Figure 8:
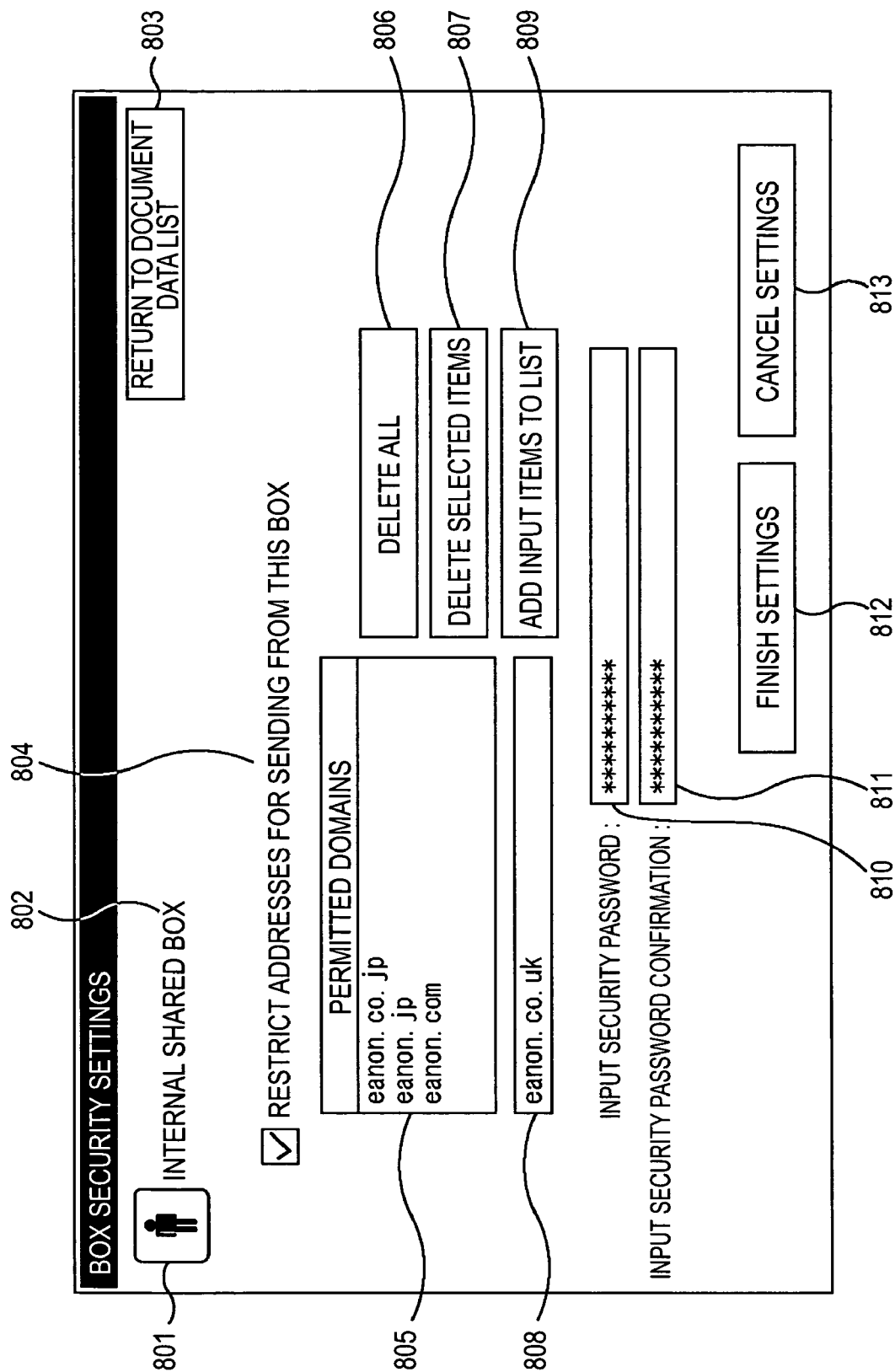
FIG. 8 is a diagram illustrating an example of a security settings screen for the box in accordance with a second embodiment of the present invention.

FIG. 8 illustrates an example of a screen for setting the security for the box with the present embodiment. This is the screen that is displayed by pressing the security setting button 404 from the screen illustrated in FIG. 4. In FIG. 8, an icon 801 is a symbol mark given to the box currently displayed on the operation panel 104, and is similar to the display of the symbol mark 301 in FIG. 3. A box name 802 is the name given to the box currently displayed, and the same name is displayed as is displayed in the box name 302 in FIG. 3.

A return button 803 is a button for returning the display of the operation panel 140 to the document data list in FIG. 4, and when the return button 803 is pressed, the display switches to the screen illustrated in FIG. 4. A restrict addresses check box 804 is for deciding whether or not to restrict the addressed in the case of sending from this box. In the case that the restrict addresses check box 804 is checked as illustrated in FIG. 8, address restrictions are performed. In the case that the restrict addresses check box 804 is not checked, no address restriction is performed.

A permitted domains list 805 is a list of the domains of the addresses to which sending is permitted. In the case there is a check in the restrict addresses check box 804, the documents accumulated in this box are permitted to be sent to the domains registered in the permitted domain list 805. Pressing a delete all button 806 causes the domains registered in the list 805 to all be deleted. A verification message, such as "All will be deleted; okay to proceed?" can be displayed for verification by the user, in which case the domains can all be deleted only when the user verifies that all are to be deleted.

If there are any selected items in the permitted domains list 805, pressing a delete selected items button 807 causes any items previously selected in the permitted domains list 805 to be deleted. In the case that no items are selected in the permitted domains list 805, nothing needs to be executed, or a message such as "no items are selected" can be provided to the user for confirmation. Alternatively, in the case that no items are selected in the address domain list 805, this button can be disabled (grayed out and rendered ineffective so as to not accept a button being pressed).

An input box 808 is a text string input box for inputting a text string representing a newly added domain name. Pressing an add input items to list button 809 causes the text string of a domain name input into the text string input box 808 to be added to the permitted domains list 805.

At this point, in the case that the text string input box 808 is empty, the add input items to list button 809 can be rendered ineffective. The input box 810 is a text string input box for the purpose of inputting a security password. The input box 811 is a text string input box for inputting verification of the security password. Both input boxes 810 and 811 use characters such as "*" for echo back in order to hide which character is actually being input.

A password is input into the input box 810, but because verification cannot be made as to whether the actual input matches the content desired for input, the same content is input again into the verification input of the input box 811, and is thus processed with a correct password setting only in the case that the same input is performed over two times.

Pressing a finish settings button causes any changed input performed as to the restrict addresses check box 804, a list of permitted domains from the permitted domains list 805, and the password input boxes 810 and 811 all become valid. However, in the case that the input content in the input boxes 810 and 811 do not match, the operation panel 104 can display a message such as "The verification input of your password does not match. Please try again", and have the screen return to screen in FIG. 8 again.

After settings are correctly made, the process switches to the document data list screen illustrated in FIG. 4. Even if changes have been made to the restrict addresses check box 804, the permitted domains list 805, or the password input to the input boxes 810 or 811, these changes are discarded and the screen returns to the setting state before entering this screen in FIG. 8, and the processing ends if a cancel settings button 813 is pressed. Afterwards, the screen switches to the document data list screen illustrated in FIG. 4. At this point the screen can be switched to another screen. The screen for sending the document data of the present embodiment is similar to that illustrated in FIG. 6.

Figure 9:
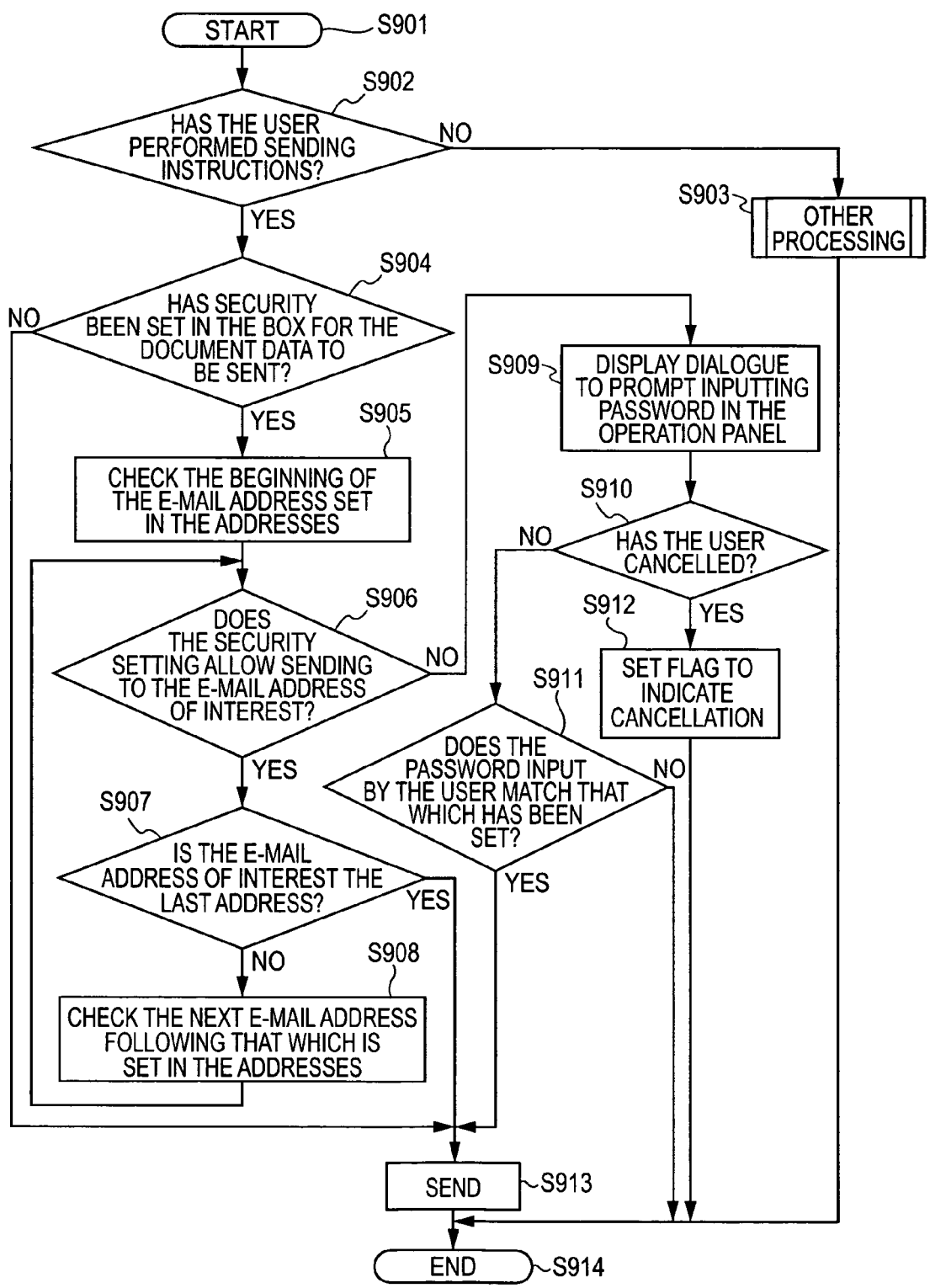
FIG. 9 is a flow chart illustrating the sending operation of the MFP in accordance with the second embodiment of the present invention.

FIG. 9 is a flow chart illustrating the operational flow in the case of sending document data from a box with the present embodiment. The present flow chart is executed with the CPU 107 of the MFP 201. First, in Step S901 the process starts. Next, in Step S902 a check is performed as to whether or not the user has performed sending instructions, and in the case that the instructions are for another operation (not sending instructions), the process proceeds to Step S903. In Step S903, processing is performed corresponding to the content instructed by the user, and the process proceeds to Step S914 and processing ends.

On the other hand, as a result of the determination of Step S902, in the case that the user had given instructions to send, the process proceeds to Step S904. The sending instructions by the user also include instructions for selecting the document data to be sent from a box, or instructions for sending addresses. In Step S904 a check is performed as to whether or not the box in which the document data with sending instructions is stored has been subjected to security settings. As a result of this check, in the case that there are no settings, the process proceeds to Step S913.

On the other hand, as a result of the check in Step S904, in the case that the box wherein the document data with sending instructions is stored has been subjected to security settings, the process proceeds to Step S905. In Step S905, the first entry in the list of e-mail addresses set in the addresses by the sending instructions is checked. In the following Step S906 a check is performed as to whether or not the current e-mail address of interest is an address within the domains permitted for sending in the security settings in the box.

As a result of this check in Step S906, in the case this is a permitted address, the process proceeds to Step S907. If it is determined in Step S906 that it is not a permitted address, the process proceeds to step S909. In Step S907 a check is performed as to whether or not the current address of interest is the last entry in the e-mail addresses list set in the addresses, and in the case it is, the process proceeds to Step S913. In the case it is not, the process proceeds to step S908, and the e-mail address of interest is advanced to the next entry, and processing is continued from Step S906, and this is repeated until the last e-mail address entry is reached.

As a result of the above-mentioned check in Step S906, in the case this is not a permitted e-mail address, the process proceeds to Step S909, and a dialog requesting password input from the user is displayed on the operation panel 104. In the following step S910, a check is performed as to whether the user cancelled without performing any input. In the case of cancellation, the process proceeds to Step S912. In the case that a password is input (user has not cancelled), the process proceeds to Step S911. In Step S911, a check is performed as to whether or not the password matches that which has been previously set, and if it matches, the process proceeds to Step S913. The previously set password is that which is input into the input boxes 810 and 811 in FIG. 8. If the passwords do not match, the process proceeds as is to Step S914 and processing ends.

In the case of cancellation in Step S910, the process proceeds to Step S912, and after setting a flag to show the cancellation, the process proceeds to Step S914 and processing ends.

In the case that the box has not been subjected to security settings in Step S904, sending can be performed unconditionally, and therefore after proceeding to Step S913 and executing the sending, the process proceeds to Step S914 and processing ends Also, in the case that the e-mail addresses have been checked up to the last one in Step S907, this indicates that all addresses are permitted addresses, and so the process proceeds to Step S913, and after sending has been executed, the process proceeds to Step S914 and ends processing.

Also, in the case that a correct password is input which matches the password set by the user in Step S911, it is determined that the user knows the necessary security password for sending. Then, after proceeding to Step S913 and executing sending, the process proceeds to Step S914 and ends processing.

In the case that the password input by the user does not match the set password, from a security standpoint it is desirable for no messages to be output and to cancel the sending, but according to a security policy of the network, an alert message can be displayed on the operation panel 104. However, in the case that the user has cancelled sending in Step S910, it is desirable for the process to return to the sending screen illustrated in FIG. 6 and continue the process. Such a switch reflects that the flag which is set in Step S912 is used. However, in either case, when the process reaches Step S914, the process of this sending operation ends.

Thus, according to the second embodiment, a password is provided during security setup, and in the case that a user attempts to send document data to an address to which sending without conditions is permitted, sending can only be executed in the case that the set password is input, and a person without sufficient authority can be prevented from sending document data on their own.

Third Embodiment

Next, a third embodiment of the multi-function printing device of the present invention will be described while referencing the drawings. The configuration diagram of a MFP 201 according to the present embodiment is also the same as that illustrated in FIG. 1. The diagram showing the network connected to the MFP 201 according to the present embodiment is the same as that illustrated in FIG. 2. Also, an example of a box list display screen according to the present embodiment is the same as that illustrated in FIG. 3. The document data list screen according to the present embodiment is the same as that illustrated in FIG. 4.

Figure 10:
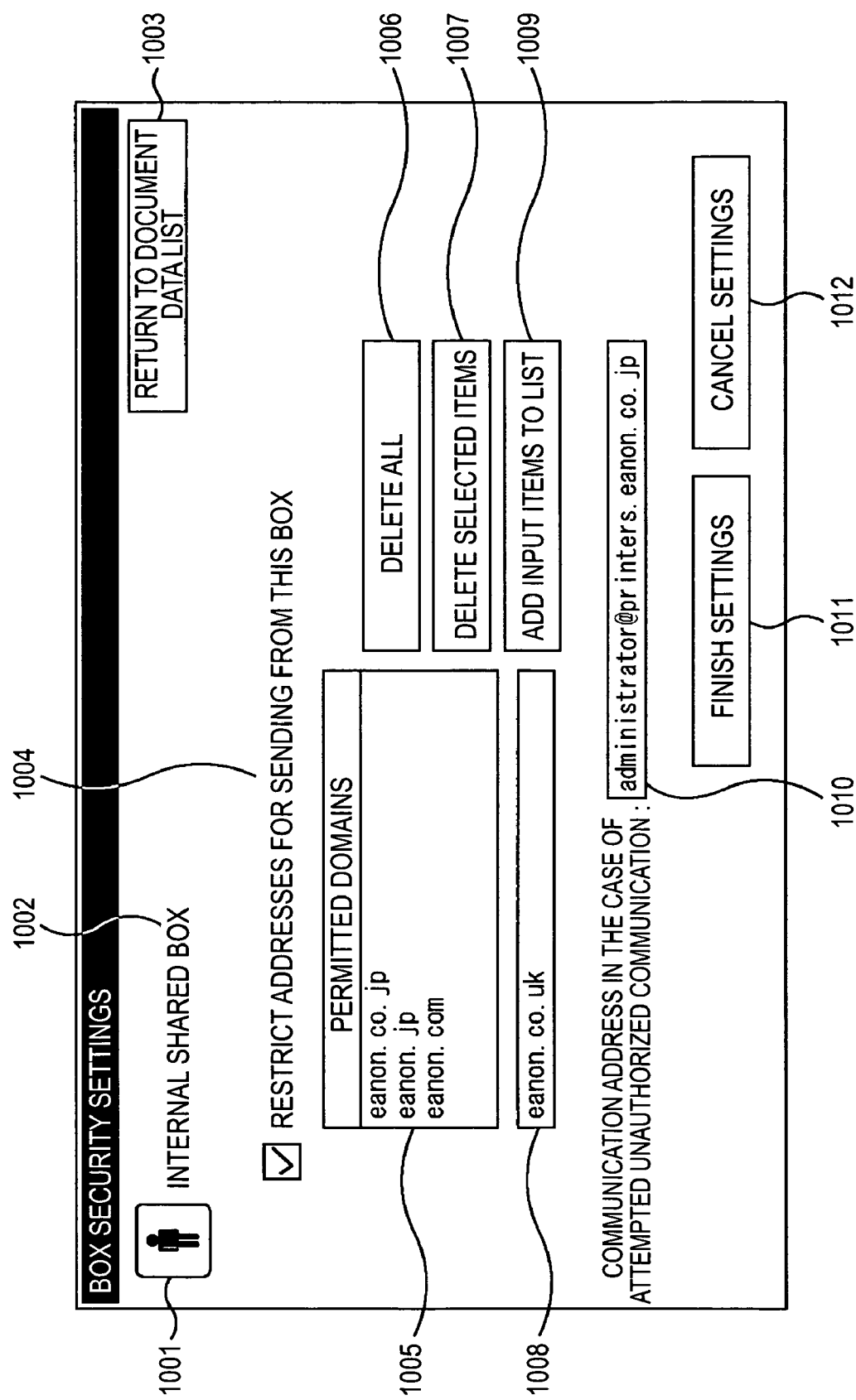
FIG. 10 is a diagram illustrating an example of a security settings screen for the box in accordance with a third embodiment of the present invention.

FIG. 10 illustrates a security setting screen according to the present embodiment. This screen is displayed by pressing the security setting button 404 on the screen illustrated in FIG. 4. In FIG. 10, an icon 1001 is a symbol mark given to the box displayed on the current operation panel 104, and is the same as that which is displayed on the symbol mark 301 in FIG. 3.

A box name 1002 is the name given to the box currently displayed, and the same name is displayed as that which is displayed with 302 in FIG. 3. A return button 1003 is a button for returning the display of the operation panel 104 to the document data list in FIG. 4, and when the return button 1003 is pressed, the screen is switched to the screen illustrated in FIG. 4.

A restrict addresses check box 1004 is for deciding whether or not to restrict the addresses in the case of sending from this box. In the case that the restrict addresses check box 1004 is checked as illustrated in FIG. 10, the appropriate security settings are made as to this box, and in the case of sending document data from this box, address restrictions are performed. In the case that the restrict addresses check box 1004 is not checked, no address restriction is performed.

A permitted domains list 1005 is a list of the domains of the addresses to which sending is permitted. In the case there is a check in the restrict addresses check box 1004, the documents accumulated in this box are permitted to be sent to the domains registered in the permitted domains list 1005. Pressing a delete all button 1006 causes the domains registered in the permitted domains list 1005 to all be deleted. A message, such as "All will be deleted; okay to proceed?" can be displayed on the operation panel 104 for verification by the user, in which case the domains can all be deleted only when the user verifies that all are to be deleted.

Pressing a delete selected items button 1007 causes items previously selected in the permitted domains address domain list 1005 to be deleted. In the case that no items are selected in the permitted domains list 1005, nothing needs to be executed, or a message such as "no items are selected" can be provided to the user for confirmation. Alternatively, in the case that no items are selected in the permitted domains list 1005, the delete selected items button 1007 can be disabled (grayed out and rendered ineffective so as to not accept a button being pressed).

An input box 1008 is a text string input box for inputting a text string representing a newly added domain name. Pressing an add input items to list button 1009 causes the domain name input into the text string input box 1008 to be added to the permitted domains list 1005.

At this point, in the case that the text string input box 1008 is empty, an add input items to list button 1009 can be rendered ineffective. An input box 1010 is a text string input box for inputting the address to be notified in the case in which unauthorized communication is attempted.

When a settings finish button 1011 is pressed, in the case any changes had been made to the restrict addresses check box 1004, the permitted domains list 1005, or the address to be notified of the text string input box 1010, these are reflected and validated, and the settings are finished in this state. In the case of a cancel settings button 1012 being pressed, all such changes are discarded, and the settings values before this screen was displayed are validated and the settings are finished. The screen for sending document data according to the present embodiment is similar to that illustrated in FIG. 6.

Figure 11:
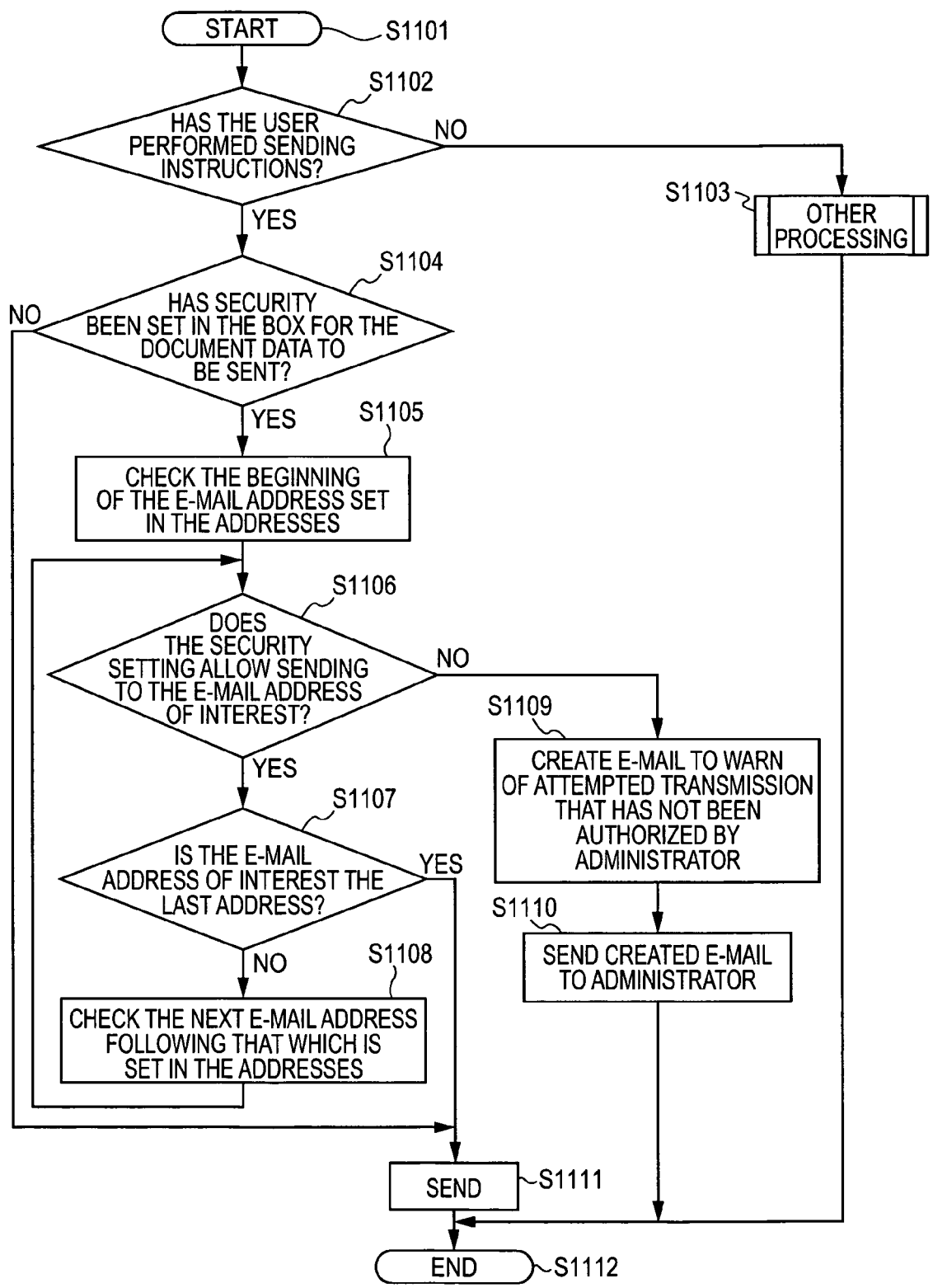
FIG. 11 is a flow chart illustrating a sending operation of the MFP in accordance with the third embodiment of the present invention.

FIG. 11 is a flow chart illustrating the operation procedures as to the operations of the present embodiment. First, in Step S1101 the process starts. Next, the process proceeds to Step S1102, and a check is performed as to whether or not the user has performed sending instructions. As a result of this check, if the instructions are for an operation other than sending instructions, the process proceeds to Step S1103. As a result of the check in Step S1102, if the instructions are for sending, the process proceeds to Step S1104.

In Step S1103, processing is performed for an operation other than sending which is instructed by the user, and the process proceeds to Step S1112 and ends the present processing. In the case that it is determined in Step S1102 that the user performs sending instructions, the process proceeds to Step S1104, and a check is performed as to whether or not security has been set for the box in which the document data to be sent is stored.

As a result of the check in Step S1104, in the case that settings have not been made, the process proceeds as is to Step S1111. In the case settings have been made, the process proceeds to Step S1105. In Step S1105, the first entry in the list of e-mail addresses set in the addresses by the sending instructions is checked.

In the following Step S1106, a check is performed as to whether or not the current e-mail address of interest has been set by the security settings so as to permit sending. As a result of this check in Step S1106, if this is not a permitted address, the process proceeds to step S1109. In the case this is a permitted address, the process proceeds to Step S1107, and a check is performed as to whether or not the current address of interest is the last entry in the e-mail addresses list set in the addresses. In the case it is the last entry, the process proceeds to Step S1111. In the case it is not the last entry, the process proceeds to step S1108, and after checking the next entry in the list of e-mail addresses set in the addresses, the process returns to Step S1106 and processing is continued, and this is repeated until the last e-mail address entry is reached.

In Step S1106, in the case that the e-mail address of interest is an address which is not permitted by the security settings for sending, the process proceeds to Step S1109, and an e-mail is generated to warn the administrator that an unauthorized transmission has been attempted. The warning e-mail created here is then sent in the subsequent step S1110.

The e-mail addresses used at this time is the notification e-mail address which is input in the text string input box 1010 in FIG. 10.

Now, there may be cases in which there are multiple e-mail addresses as the sending addresses for a box document, and within these may be multiple e-mail addresses which are not permitted by the security settings for sending. In this case, according to the flow in FIG. 11, the e-mail address which is the first entry is checked in Step S1106, a warning e-mail is generated and sent, and the flow ends. Accordingly, the process ends without checking an e-mail address not permitted by the security settings for sending in step S110 which is a later entry.

As another arrangement of the flow in FIG. 11, the following process can be performed. At the point in which the first entry of an e-mail not permitted by the security settings for sending in Step S1106 is found, all other entries in the addresses are checked and all e-mail addresses in the sending addresses not permitted by the security setting are extracted. Then a warning e-mail is generated which describes in the text thereof the list of e-mail addresses extracted in Step S1109, and can be sent to the administrator in Step S1110.

After the warning e-mail has been sent, the process proceeds to Step S1112, and processing ends. In the case that security is not set for the box in Step S1104, the process proceeds to Step S1111, and because the sending has no restrictions, after the document data is sent as is, the process proceeds to Step S1112 and processing ends.

Also, in the case that the e-mail address of interest is the last address in Step S1107, this indicates that all e-mail addresses in the sending addresses which have been checked are addresses for which sending is permitted, and therefore, after the process proceeds to Step S1111 and sending is executed, the process proceeds to Step S1112 and processing ends.

Thus according to the present embodiment, because the notification to the administrator is included in the security settings, in the case that a user attempts to send document data to an unauthorized address, the sending is prevented, and additionally, an e-mail can be sent to the administrator to notify that an operation has been attempted to send document data with security settings. Thus, a situation can be prevented in which a user not authorized for sending sends document data on his/her own, and also the administrator can observe operations with security problems, and can perform operations to prevent further damage in advance.

Fourth Embodiment

Next, a fourth embodiment of the present invention will be described while referencing the drawings. The configuration of an MFP 201 according to the present embodiment is the same as that illustrated in FIG. 1. Also, the diagram showing the network 206 connected to the MFP 201 according to the present embodiment is the same as that illustrated in FIG. 2. An example of a box list screen according to the present embodiment is the same as that illustrated in FIG. 3. Also an example of the document data list screen in a box is the same as that illustrated in FIG. 4.

Figure 12:
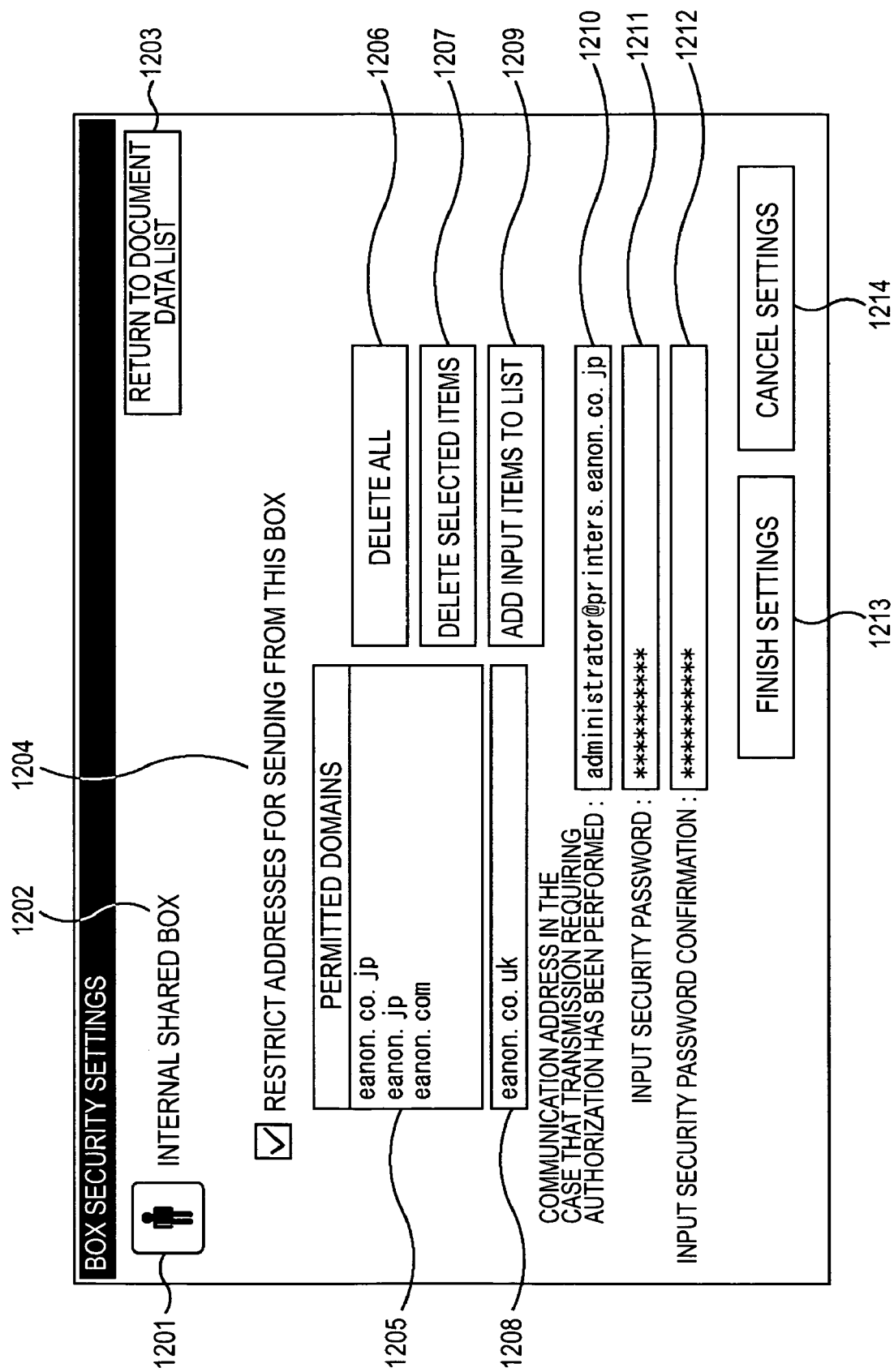
FIG. 12 is a diagram illustrating an example of a security settings screen for the box in accordance with a fourth embodiment of the present invention.

FIG. 12 is an example of a screen displayed on the operation panel 104 for the purpose of setting security of the box for the MFP 201 of the present embodiment. In FIG. 12, an icon 1201 is a symbol mark given to the box currently displayed, and is the same as that which is displayed for the symbol mark 301 in FIG. 3. A box name 1202 is the name given to the box currently displayed, and is the same as that which is displayed in 302 of FIG. 3.

A return button 1203 is a button for returning the display of the operation panel 104 to the document data list in FIG. 4, and when the return button 1203 is pressed, the screen is switched to the screen illustrated in FIG. 4. A restrict addresses check box 1204 is for deciding whether or not to restrict the addresses in the case of sending from this box. In the case that the restrict addresses check box 1204 is checked as illustrated in FIG. 12, address restrictions are performed. In the case that the restrict addresses check box 1204 is not checked, no particular address restriction is performed.

A permitted domains list 1205 is a list of the domains of the addresses to which sending is permitted. In the case there is a check in the restrict addresses check box 1204, sending to domains registered in this list are permitted unconditionally.

Pressing a delete all button 1206 causes all of the domains registered in the list permitted domains list 1205 to be deleted. A message such as "All will be deleted; okay to proceed?" can be displayed for verification by the user, in which case the domains can all be deleted only when the user verifies that all are to be deleted.

A delete selected items button 1207 is used to delete items previously selected in the permitted domains list 1205. In the case that no items are selected in the permitted domains list 1205, nothing needs to be executed, or a message such as "no items are selected" can be displayed on the operation panel 104 and verification can be requested to the user. Alternatively, in the case that no items are selected in the permitted domains list 1205, the delete selected items button 1207 can be disabled (grayed out and rendered ineffective so as to not accept a button being pressed).

An input box 1208 is a text string input box for inputting a text string representing a newly added domain name. Pressing an add input items to list button 1209 causes the domain name input into the text string input box 1208 to be added to the permitted domains list 1205 in the list of domains permitted unconditionally.

At this point, in the case that the text string input box 1208 is empty, the add input items to list button 1209 can be rendered ineffective. The input box 1210 is a text string input box for inputting the e-mail address to be notified in the case that communication requiring authorization is attempted. The input box 1211 is a text string input box for inputting a security password. The input box 1212 is a text string input box for inputting verification of the security password.

Both input boxes 1211 and 1212 use characters such as asterisks "*" for echo back in order to hide which character is actually being input. A password is input into the text string input box 1211, but because verification cannot be made as to whether the actual input matches the content desired for input, the same content is input again into the verification input of the text string input box 1212, and is thus processed with a correct password setting only in the case that the same input is performed over two times.

In the case that a finish settings button 1213 is pressed, a check is performed as to whether the password input in the text string input box 1211 matches the password verification input in 1212, and after this, and in the case that they do not match, a message such as "password is incorrect" is displayed, and the screen is returned to this screen. On the other hand, if they do match, the item currently input overwrites the settings and the settings are finished. In the case that a cancel settings button 1214 is pressed, all changes are cancelled regardless of the values currently input, and the values set before this screen was displayed continue to be used. The screen for sending the document data of the present embodiment is similar to that illustrated in FIG. 6.

Next, the sending operation with the MFP 201 according to the present embodiment will be described using the flow chart illustrated in FIG. 13. First, in Step S1301 the process starts. Next, in Step S1302, a check is performed as to whether or not the user has performed sending instructions. In the case that the instructions are for an operation other than for sending, the process proceeds to Step S1303.

In Step S1303, processing is performed for the instructions by the user, and the process proceeds to Step S1313 and processing ends. In the case that it is determined in Step S1302 that the user performed sending instructions, the process proceeds to Step S1304. In Step S1304, a check is performed as to whether or not security has been set for the box in which the document data to be sent is stored.

As a result of the check in Step S1304, in the case that security settings have not been made, the process proceeds to Step S1312. In the case settings have been made, the process proceeds to Step S1305. In Step S1305, the first entry in the list of e-mail addresses set in the addresses by the sending instructions is checked.

In the following Step S1306, a check is performed as to whether or not the e-mail address of interest has been set by the security settings so as to permit sending. As a result of this check, if this is not a permitted address, the process proceeds to step S1309. In the case this is a permitted address, the process proceeds to Step S1307.

A check is performed as to whether or not the current e-mail address of interest is the last entry in the e-mail addresses list set in the addresses in step S1307. As a result of this check, in the case it is the last entry, the process proceeds to Step S1312, and otherwise, the process proceeds to step S1308.

In Step S1308, after checking the next entry in the e-mail address list set in the addresses, the process returns to Step S1306 and continues processing. This processing is repeated until the last e-mail address entry is reached. If the addresses in Step S1306 are not addresses which are unconditionally permitted, the process proceeds to Step S1309.

In Step S1309, a warning e-mail is generated to the administrator to warn that a transmission is attempted which is not permitted unconditionally. Then in the following Step S1310, this e-mail is sent to the e-mail address specified as the notification address in the case that authorization is required with the security settings. In the following Step S1311 the sending data such as the document data, the address list, and the subject to be currently sent are temporarily stored in the storage device 105. Once this is stored, the process proceeds to Step S1313 and processing ends.

As a result of the check in Step S1304, in the case that no security settings have been performed on the box, or in the case that verification is made that the e-mail address checked in Step S1307 is the last e-mail address and that all of the e-mail addresses are e-mail addresses which permit settings unconditionally, the process proceeds to Step S1312, and sending is executed. Afterwards, the process proceeds to Step 1313 and the sending process ends.

Figure 13:
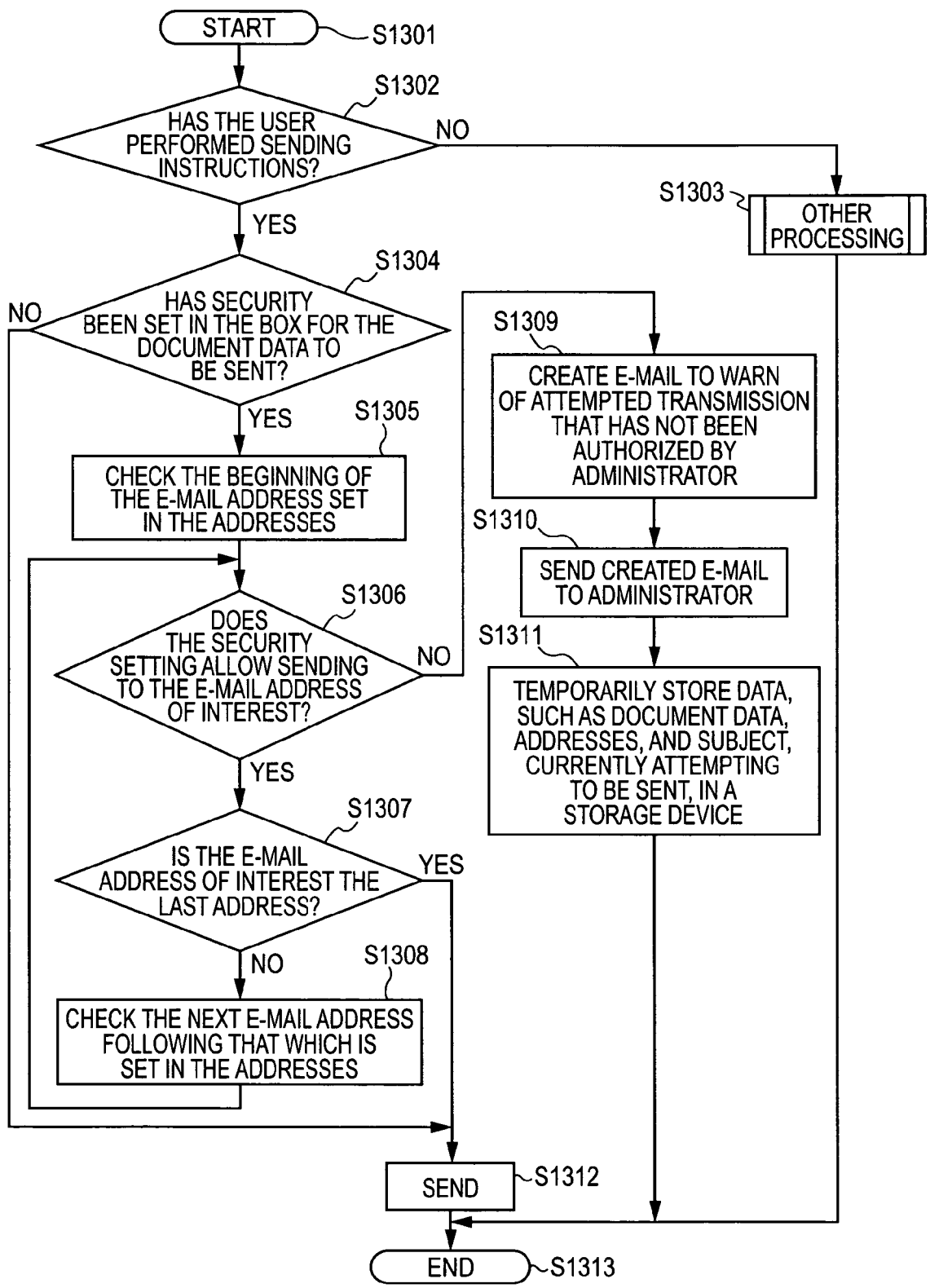
FIG. 13 is a flow chart illustrating the sending operation of the MFP in accordance with the fourth embodiment of the present invention.

FIG. 14 illustrates an example of a warning e-mail generated in Step S1309 in FIG. 13 and sent to the administrator in Step S1310. In FIG. 14, this is a screen displaying the warning e-mail on the computer of the administrator. When the Uniform Resource Locator (URL) described in the warning e-mail is accessed through a WWW browser, a screen is displayed such as that illustrated in FIG. 15. The URL described in the warning e-mail is information which specifies a resource retained by the HTTP server 110 included in the MFP 201, for example, HTML (HyperText Markup Language) content or JAVA script or Common Gateway Interface (CGI). With the present embodiment, the HTTP server is configured so as to be included in the MFP 201, but the configuration can have a server on the network 206.

Figure 15:
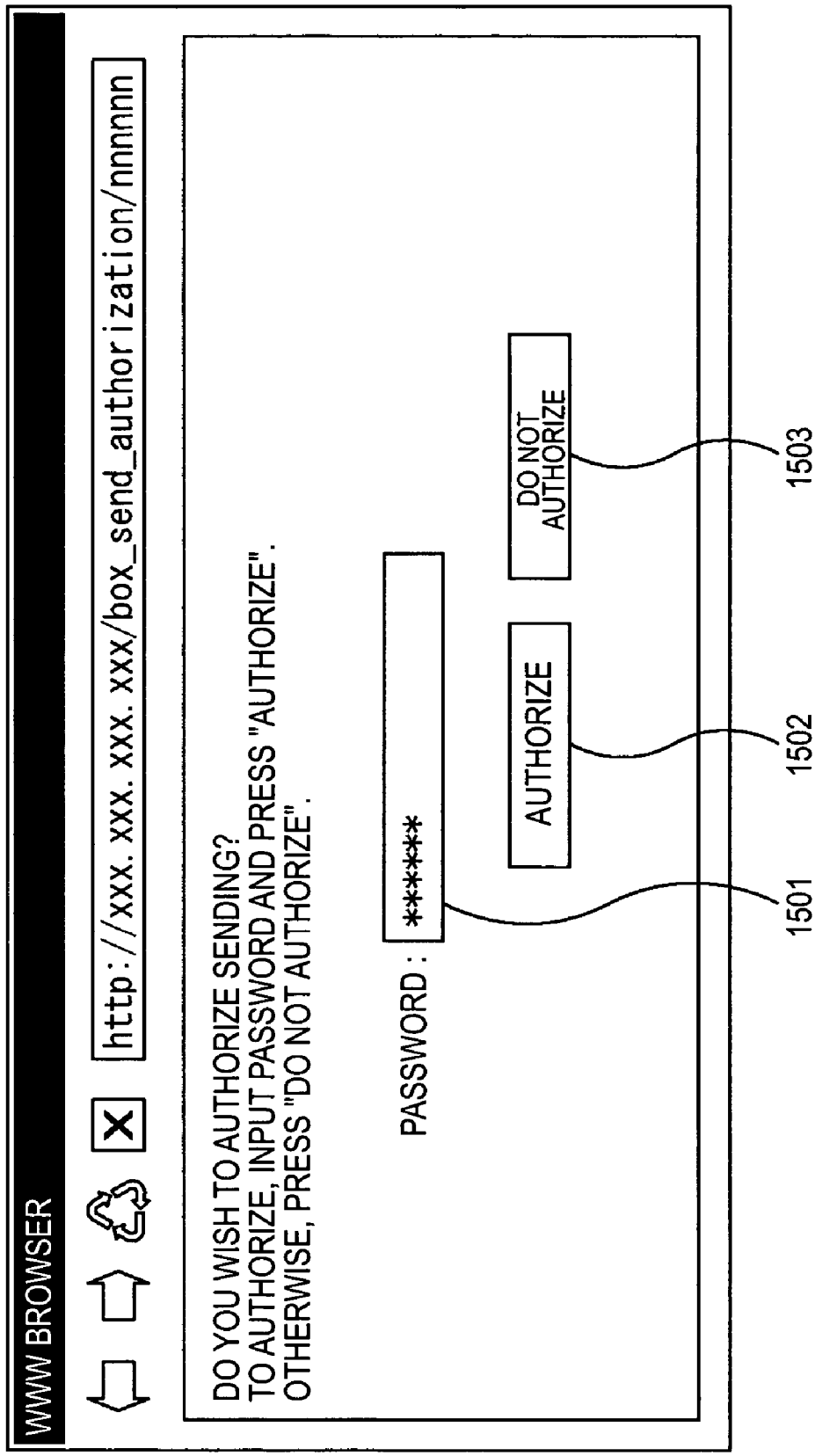
FIG. 15 is a diagram illustrating a World Wide Web (WWW) browser screen for the administrator to instruct permission for sending in accordance with the fourth embodiment of the present invention.

In FIG. 15, an input field 1501 is for inputting a password. An authorize button 1502 and a do not authorize button 1503 are provided. When the security password set in the text string input box 1211 is input into the password input field 1501 on this screen and the "authorize" button 1502 is pressed, the input content is sent to the HTTP server 110 of the MFP 201, and this sending content is transmitted from the HTTP server 110 to the control device 101, and the control device 101 verifies that the administrator has given permission for this transmission.

In the case that the password input in the input field 1501 is incorrect, the transmission is cancelled. Also, in the case that the do not authorize button 1503 is pressed, the transmission is cancelled. Only in the case that the correct password is input into the input field 1501 and the authorize button 1502 is pressed will the transmission be executed.

Figure 16:
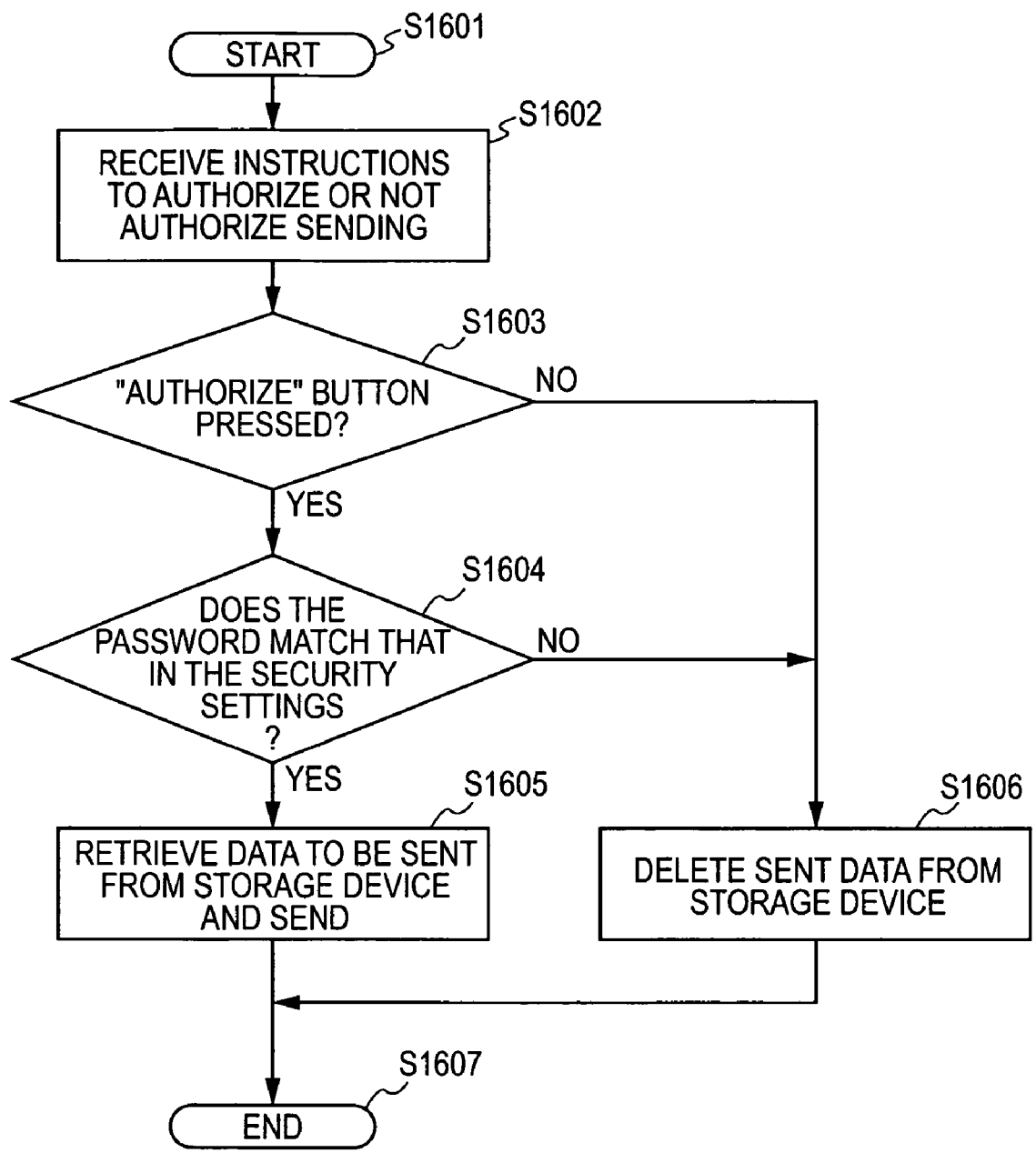
FIG. 16 is a flow chart illustrating the sending operation of the MFP after the administrator has instructed permission for sending in accordance with the fourth embodiment of the present invention.

FIG. 16 is a flow chart showing the sending operation from the computer of the administrator to the HTTP server 110, and the processing operation in the control device 101. This flow chart is executed by the CPU 107 of the control device 101 of the MFP 201. Before performing this processing, a warning e-mail is sent to the administrator in Step S1309 and S1310 in FIG. 13, and in Step S1311, the document data to be sent is temporarily stored in the storage device 105. Then the process starts by the administrator performing input on the screen in FIG. 15, by pressing the authorize button 1502 or the do not authorize button 1503, and performing the transmission of information from the WWW browser. The processing starts in Step S1601.

Next, in Step S1602 the instructions are received from the sending administrator. In the following Step S1603, a check is performed as to whether or not the pressed button is the authorize button 1502. As a result of this check, in the case it is the authorize button, the processing proceeds to Step S1604. Otherwise, in other words, in the case that the do not authorize button 1503 is pressed, the process proceeds to Step S1606.

In Step S1604, a check is performed as to whether the password input in the password input field 1501 matches the password input in the text string input box 1211. As a result of this check, in the case they match, the process proceeds to Step S1605. If they do not match, the process proceeds to Step S1606.

In Step S1605, the data such as the document data, addresses, and subject line which are temporarily stored in the storage device 105 are retrieved, and sending is executed based on this data. After sending is executed, the process proceeds to Step S1607 and processing ends.

In Step S1606, the administrator has not authorized sending, and therefore the data such as the document data, addresses, and subject which are temporarily stored in the storage device 105 are deleted. Also in this case the sending is not executed. When the deleting processing is finished, the process proceeds to Step S1607 and processing ends.

According to this embodiment, in the case that sending is performed which requires authorization from the administrator, notification can be received in the terminal device used by the administrator, and also the authorization as to this sending can be given via a network. Thus, incorrect transmissions can be prevented in advance, and also such security administration can be easily performed.

Other Embodiments

With the first embodiment through the third embodiment, domains permitted for sending a document were set as a security setting, but alternatively, domains prohibited from sending documents can be set.

Also, the various functions for configuring the printing device in the above-described embodiments of the present invention, in other words, the security setting function, the document data sending function, the security setting determining function and so forth can be realized by operating a program stored in the RAM or ROM of a computer. Also, the various steps of the document data sending method with the above-described printing device can be realized by operating a program stored in the RAM or ROM of a computer.

Specifically, the above-mentioned program is stored on a storage medium such as a compact disk—read only memory (CD-ROM) for example, or via various transmission media, and provided to the computer. Storage media used for storing the above-mentioned program can be a flexible disk, a hard disk, a magnetic tape, a magneto-optical disk, a nonvolatile memory card and the like, other than a CD-ROM. On the other hand, a transmission medium for the above-mentioned program can be a communication medium (a cable line such as optical fiber, a wireless line, etc.) in a computer network (a local area network (LAN), a wide area network (WAN) such as the Internet, or a wireless communication network and so forth) system for the purpose of propagating the program information as a carrier wave and supplying it.

Also, not only are the various functions of the above-described embodiments realized by executing the program provided to the computer, but in the case that the various functions of the above-described embodiments are realized in cooperation with the operating system software operating on the computer on which the program is running, or with other application software, or in the case that the various functions of the above-described embodiments are realized by all or part of the processing of the supplied program being performed by a function expansion board or a function expansion unit, the programs thereof are included in the present invention.

According to the present embodiment, multiple boxes are prepared for accumulating document data, and security settings as to the desired boxes are performed in advance, and therefore, document data with a high degree of secrecy can be kept from being sent without authorization from the administrator.

Also, security settings are performed for the boxes, so the trouble of performing security settings for each document and errors in settings are reduced.

Furthermore, security settings are performed based on the addresses when the document data is sent, so the document data with security settings are prevented from being sent to an address other than those authorized.

Also, sending can only be executed in the case that the set password is input, so a user without sending authorization is prevented from sending document data on his/her own.

In addition, the security settings include a notification to the administrator, so in the case that a user attempts to send document data to an address to which sending is not permitted, the administrator can be notified that there has been an operation attempting to send document data with security settings. Thus a situation is prevented in which an unauthorized user sends document data without the administrator being aware of this sending, and measures can be taken to prevent further damage by the administrator observing operations with security problems.

Also, in the case that transmission is performed which needs administrator authorization, notification can be received on the terminal device used by the administrator, and the authorization for this transmission can be given via a network. Thus, incorrect transmissions can be prevented in advance, and additionally such security administration can be easily performed.

While the present invention has been described with reference to exemplary embodiments, it is to be understood that the invention is not restricted to the disclosed exemplary embodiments. The scope of the following claims is to be accorded the broadest interpretation so as to encompass all modifications, equivalent structures and functions.

This application claims the benefit of Japanese Application No. 2004-271720 filed Sep. 17, 2004, which is hereby incorporated by reference herein in its entirety.

What is claimed is:

1. An image processing device comprising:
a storage unit having multiple storage regions, and adapted to store document data in the storage regions;
a security settings unit adapted to set settings relating to security as to the storage regions, wherein the setting relating to security include setting to restrict a sending address of the document data stored in the storage region and to set a notification address to notify for an authorization request as a setting relating to security;
a specifying unit adapted to specify the document data to be sent externally from the document data stored in the storage unit;
a control unit adapted to determine whether the storage region in which the document data specified by the specifying unit is stored is a storage region in which settings relating to security have been set by the security settings unit, and to decide based on results of such determining whether to permit or prohibit sending of the document data; and
a sending permission request notifying unit adapted to send a permission request of the document data to the notification address in a case that the sending address of the document data stored in the storage region is a sending address which has been restricted by the security settings unit.

2. The image processing device according to claim 1, wherein the control unit is adapted to decide to permit or prohibit the sending of the document data based on whether the sending address of the document data to be sent is a sending address which has been restricted by the security settings unit.

3. The image processing device according to claim 2, wherein the security settings unit is adapted to restrict sending addresses of the document data stored in the storage region by specifying a network domain to permit sending.

4. The image processing device according to claim 2, further comprising a user interface adapted to accept instructions from a user;
wherein the security settings unit is adapted to set a password as a setting relating to security;
and wherein the control unit is adapted to permit sending of the document data under a condition that the same password is input which is the password set by the security settings unit from the user interface in a case that the sending address of the document data is a sending address which has been restricted by the security settings unit.

5. The image processing device according to claim 2, wherein
the image processing device further comprises a notifying unit adapted to send a notification to the notification address that a prohibited transmission has been attempted in a case that the sending address of the document data stored in the storage region is a sending address which has been restricted by the security settings unit.

6. The image processing device according to claim 1, wherein the control unit is adapted to permit sending to the restricted sending address based on a permission response received externally wherein the sending permission request notifying unit has responded to the permission request, and prohibits sending to the restricted sending address based on a prohibition response received externally wherein the sending permission request notifying unit has responded to the permission request.

7. The image processing device according to claim 1, wherein the sending permission request notifying unit is adapted to send a notification via e-mail describing a request for an authorization to send the document data stored in the storage region in which security setting has been performed to the notification address set by the security settings unit.

8. The image processing device according to claim 7, wherein the e-mail describes access information for inputting permission or prohibition information in response to the authorization request for sending the document data which is stored in the storage region in which security setting has been performed.

9. The image processing device according to claim 8, wherein the access information for inputting the permission or prohibition information described in the e-mail is access information to a predetermined resource within the image processing device;
and wherein the control unit is adapted to decide permission or prohibition of sending the document data stored in the storage region in which security setting has been performed to the restricted sending address based on information input from accessing the predetermined resource and based on the access information.

10. A document data sending method to be carried out with an image processing device having a storage unit which has multiple storage regions and stores document data in the storage regions, the method comprising:
a security setting step which sets settings relating to security as to the storage regions, wherein the settings relating to security include settings to restrict a sending address of the document data stored in the storage region and to set a notification address to notify for an authorization request as a setting relating to security;
a specifying step for specifying the document data to be sent externally from the document data stored in the storage unit;
a control step for determining whether the storage region in which the document data specified in the specifying step is stored is a storage region in which settings relating to security have been set in the security settings step, and for deciding based on results of such determining whether to permit or prohibit sending of the specified document data; and
a sending permission request notifying step for sending a permission request of the document data to the notification address in a case that the sending address of the document data stored in the storage region is a sending address which has been set in the security settings step.

11. A computer-readable storage medium having stored thereon a computer program for causing a computer to execute a document data sending method with an image processing device having a storage unit which has multiple storage regions and stores document data within the storage regions, the computer program comprising:
a security settings module which sets settings relating to security as to the storage regions, wherein the settings relating to security include settings to restrict a sending address of the document data stored in the storage region and to set a notification address to notify for an authorization request as a setting relating to security;
a specifying module for specifying the document data to be sent externally from the document data stored in the storage unit;
a control module for determining whether the storage region in which the document data specified by the specifying module is stored is a storage region in which settings relating to security have been set by the security settings module, and for deciding based on results of such determining whether to permit or prohibit sending of the specified document data; and
a sending permission request notifying module for sending a permission request of the document data to the notification address in a case that the sending address of the document data stored in the storage region is a sending address which has been set by the security settings module.

* * * * *